Feb. 15, 1966 C. J. KINSEY ET AL 3,235,073

BALANCING MACHINE

Original Filed Nov. 30, 1955 25 Sheets-Sheet 1

INVENTORS
Claude J. Kinsey,
Philip K. Trimble &
William J. Volke
BY
L. D. Burch
ATTORNEY INVENTORS
Claude J. Kinsey,
Philip K. Trimble &
BY William J. Volke
L. D. Burch
ATTORNEY

BALANCING MACHINE

Original Filed Nov. 30, 1955

INVENTORS
Claude J. Kinsey,
Philip K. Trimble &
William J. Volke
BY
L. D. Burch
ATTORNEY Feb. 15, 1966 C. J. KINSEY ET AL 3,235,073

BALANCING MACHINE

Original Filed Nov. 30, 1955 25 Sheets-Sheet 4

INVENTORS
Claude J. Kinsey,
Philip K. Trimble &
William J. Volke

BY L. D. Burch
ATTORNEY

INVENTORS
Claude J. Kinsey,
Philip K. Trimble &
William J. Volke
BY
L. D. Burch
ATTORNEY INVENTORS
Claude J. Kinsey,
Philip K. Trimble &
William J. Volke
BY
L. D. Burch
ATTORNEY INVENTORS
Claude J. Kinsey,
Philip K. Trimble &
William J. Volke
BY
L. D. Burch
ATTORNEY INVENTORS
Claude J. Kinsey,
Philip K. Trimble &
William J. Volke
BY
L. D. Burch
ATTORNEY INVENTORS
Claude J. Kinsey,
Philip K. Trimble &
BY William J. Volke
L. D. Burch
ATTORNEY INVENTORS
Claude J. Kinsey,
Philip K. Trimble &
William J. Volke
BY
L. D. Burch
ATTORNEY

BALANCING MACHINE

INVENTORS
Claude J. Kinsey,
Philip K. Trimble &
BY William J. Volke
L. D. Burch
ATTORNEY INVENTORS
Claude J. Kinsey,
Philip K. Trimble &
William J. Volke
BY
L. D. Burch
ATTORNEY Feb. 15, 1966 C. J. KINSEY ET AL 3,235,073

BALANCING MACHINE

Original Filed Nov. 30, 1955 25 Sheets-Sheet 13

INVENTORS
Claude J. Kinsey,
Philip K. Trimble &
William J. Volke
BY
L. D. Burch
ATTORNEY

BALANCING MACHINE

Original Filed Nov. 30, 1955 25 Sheets-Sheet 14

INVENTORS
Claude J. Kinsey,
Philip K. Trimble &
William J. Volke
BY
L. D. Burch
ATTORNEY INVENTORS
Claude J. Kinsey,
Philip K. Trimble &
William J. Volke
BY
L. D. Burch
ATTORNEY INVENTORS
Claude J. Kinsey,
Philip K. Trimble &
William J. Volke
BY
L. D. Burch
ATTORNEY Feb. 15, 1966 C. J. KINSEY ET AL 3,235,073

BALANCING MACHINE

Original Filed Nov. 30, 1955 25 Sheets-Sheet 17

INVENTORS
Claude J. Kinsey,
Philip K. Trimble &
William J. Volke
BY
L. D. Burch
ATTORNEY

BALANCING MACHINE

Original Filed Nov. 30, 1955

INVENTORS
Claude J. Kinsey,
Philip K. Trimble &
William J. Volke
BY
L. D. Burch
ATTORNEY INVENTORS
Claude J. Kinsey,
Philip K. Trimble &
BY William J. Volke
L. D. Burch
ATTORNEY INVENTORS
Claude J. Kinsey,
Philip K. Trimble &
William J. Volke
BY
L. D. Burch
ATTORNEY INVENTORS
Claude J. Kinsey,
Philip K. Trimble &
William J. Volke
BY
L. D. Burch
ATTORNEY INVENTORS
Claude J. Kinsey,
Philip K. Trimble &
William J. Volke
BY
L. D. Burch
ATTORNEY INVENTORS
Claude J. Kinsey,
Philip K. Trimble &
William J. Volke
BY
L. D. Burch
ATTORNEY INVENTORS
Claude J. Kinsey,
Philip K. Trimble &
William J. Volke
BY
[signature]
ATTORNEY Feb. 15, 1966 C. J. KINSEY ET AL 3,235,073

BALANCING MACHINE

Original Filed Nov. 30, 1955 25 Sheets-Sheet 25

INVENTORS
Claude J. Kinsey,
Philip K. Trimble &
BY William J. Volke

L. D. Burch
ATTORNEY

United States Patent Office 3,235,073

Patented Feb. 15, 1966

3,235,073

BALANCING MACHINE

Claude J. Kinsey, Detroit, Philip K. Trimble, Rochester, and William J. Volke, Detroit, Mich., assignors to General Motors Corporation, Detroit, Mich., a corporation of Delaware Original application Nov. 30, 1955, Ser. No. 550,057. Divided and this application June 4, 1962, Ser. No. 217,502

3 Claims. (Cl. 209—72)

This is a division of copending application Serial No. 550,057, to Claude J. Kinsey, Philip K. Trimble and William J. Volke, filed November 30, 1955, and entitled "Balancing Machine," now abandoned.

This invention relates to balance means generally and more particularly to operatively interconnected means for automatically receiving and inspecting work members and making unbalance correction thereto.

The normal balancing operation being a most tedious, exacting and time-consuming operation, the balancing of rotatable members is one of the largest obstacles to highest production rates in the manufacture of mechanical devices having rotating parts.

It is here proposed to provide automatic means for receiving work members for unbalance inspection, determination and correction as well as material handling. It is proposed to provide interrelated work receiving and transfer means adapted to convey work members progressively through interconnected balance detection, determination, correction, inspection and selection work stations. Balance detection and determination are to be by single station means rotating work members at high speeds to take advantage of the centrifugal force multiplication of otherwise insignificant unbalanced factors. Unbalance correction is to be by welding a measured, cut and formed material piece to the work member opposite the excess weight thereof causing unbalance; which correction is to be in automatic accord with the balance determinations at a subsequent work station. Work members are to be accepted or rejected in automatic accord with an inspection made at a subsequent work station following the correction previously found necessary to be made. The operation of each work station is to be interdependent upon the work conveyor means and the receipt of a work member.

Figure 6:
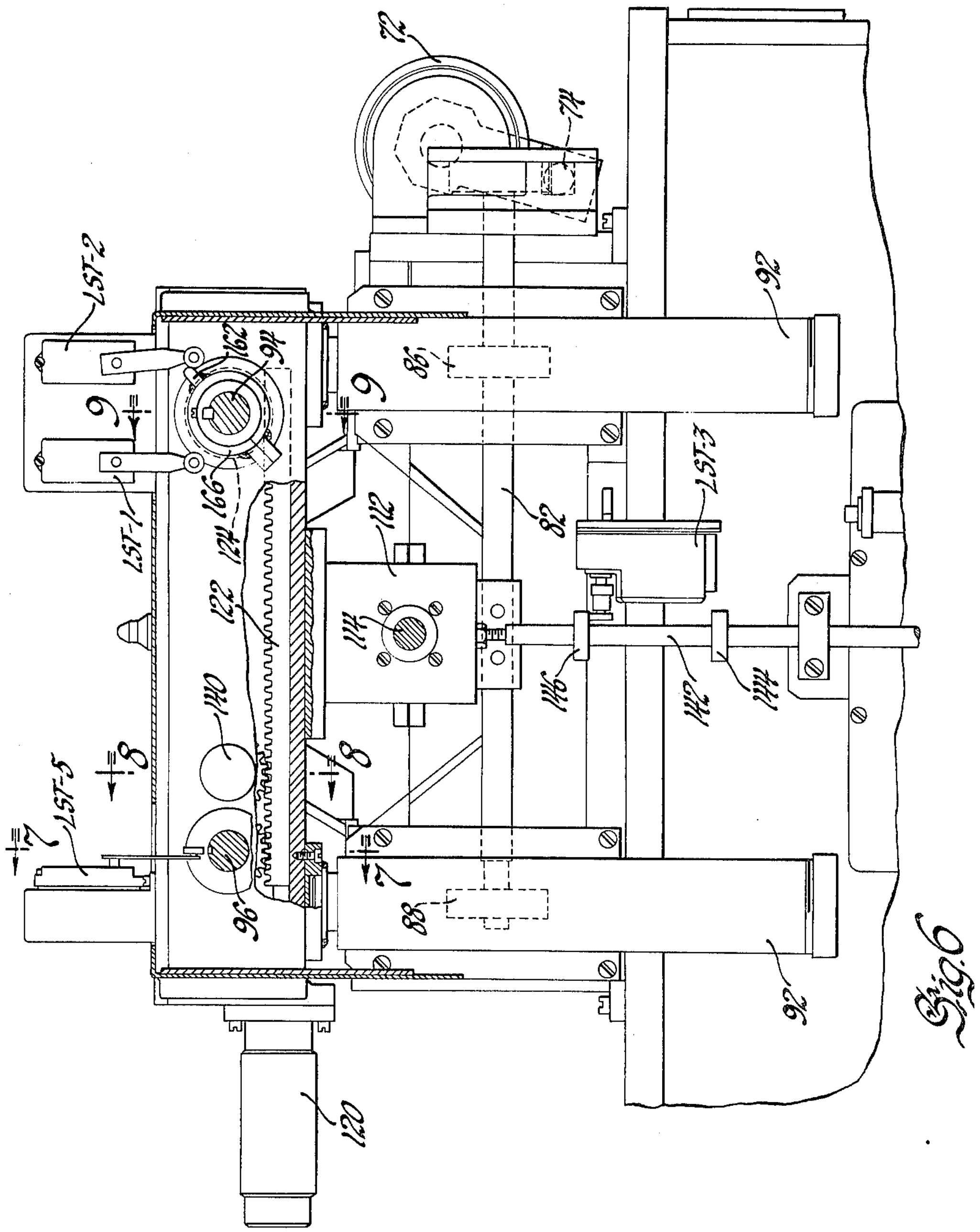
FIGURE 6 is an enlarged end view of the proposed balancing machine, as seen in the plane of line 6—6 of FIGURE 2, looking in the direction of the arrows thereon, and having a part broken away to show part of the work transfer means.
Figure 7:
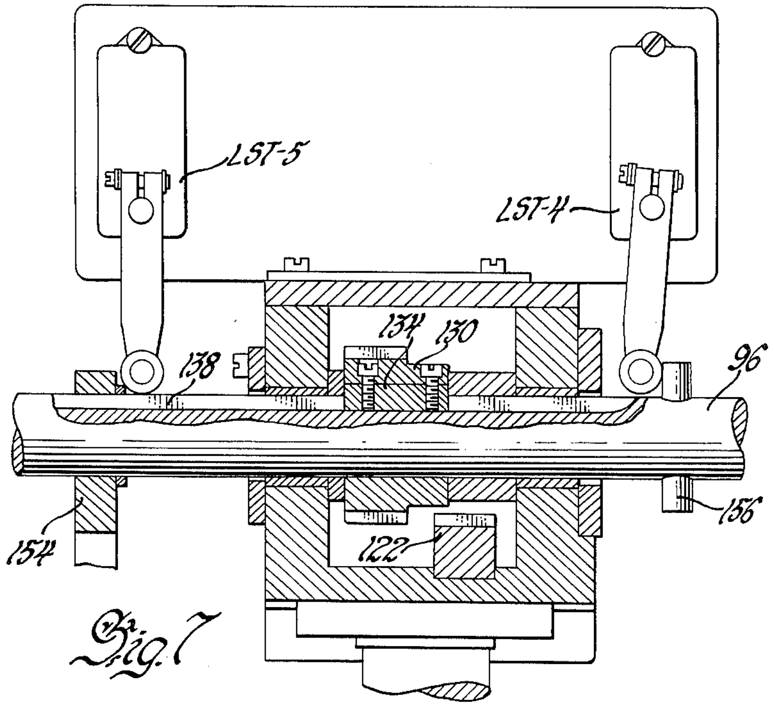
Figure 8:
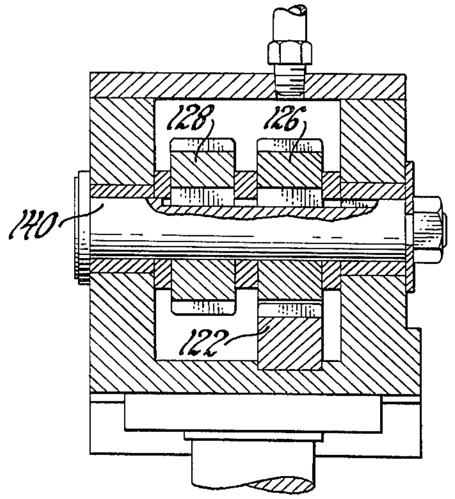
Figure 9:
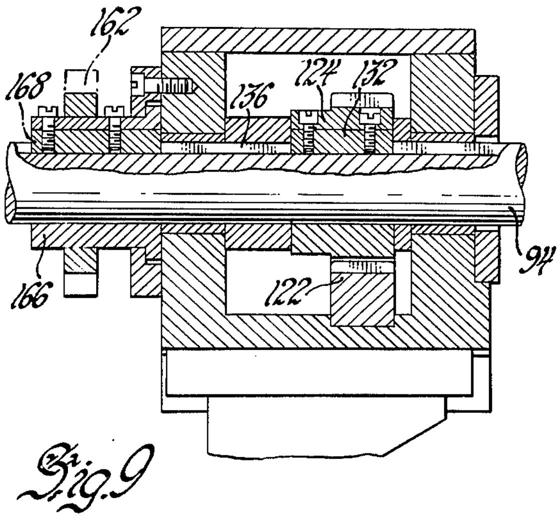

FIGURES 7, 8 and 9 are enlarged cross-sectional views of parts of the work transfer means as seen in the planes of lines 7—7, 8—8 and 9—9, respectively, of FIGURE 6, looking in the direction of the arrows thereon.

Figures 2, 3:
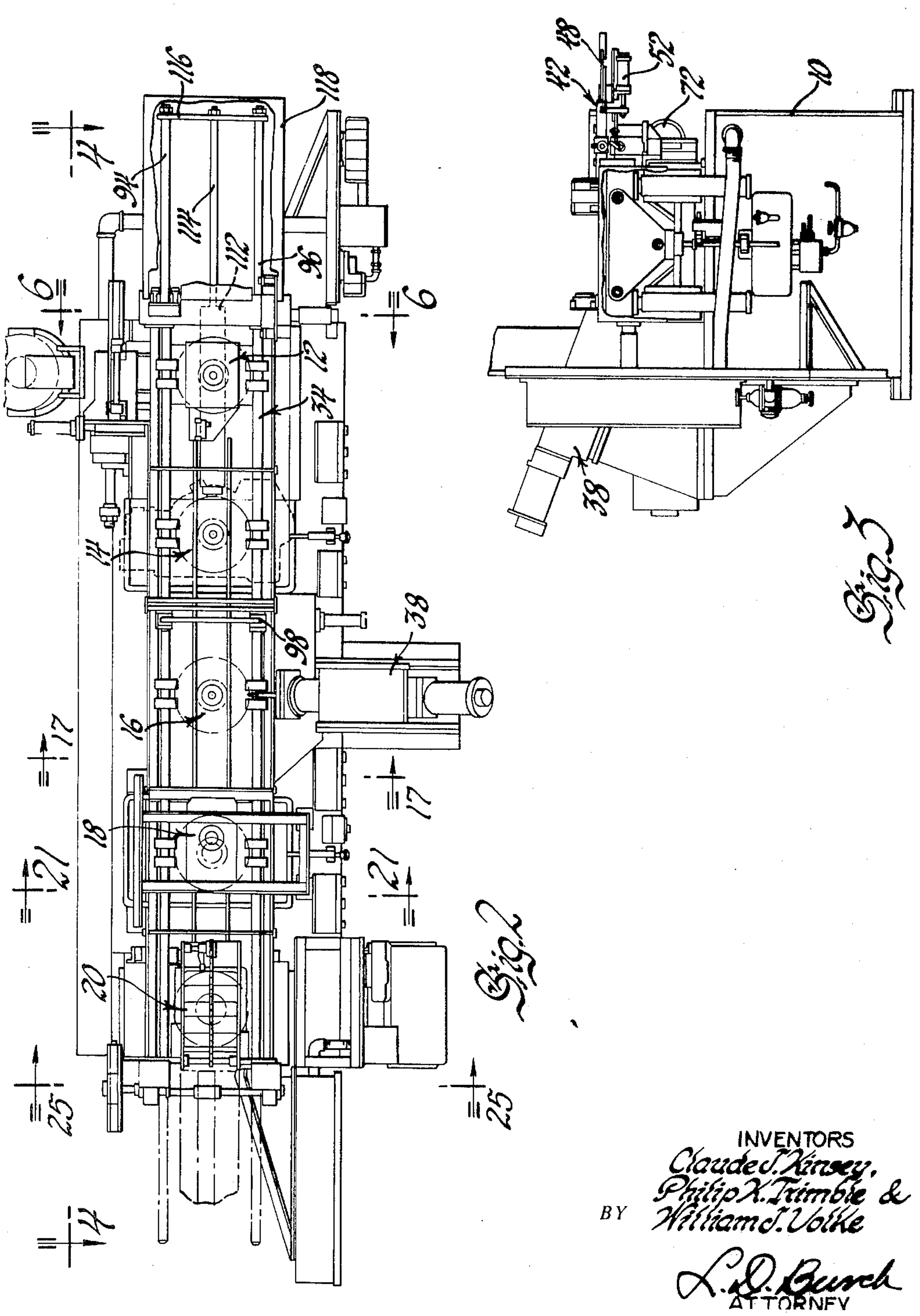
FIGURE 2 is a top plan view of the proposed balancing machine.
FIGURE 3 is an end plan view of the proposed balancing machine.
Figure 4:
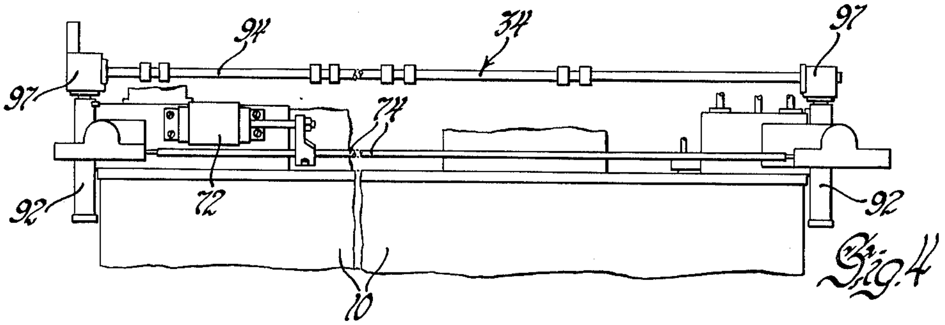
FIGURE 4 is a reduced and simplified side view of the proposed balancing machine as viewed in the plane of line 4—4 of FIGURE 2, looking in the direction of the arrows thereon, to more clearly show the work transfer means.
Figure 5:
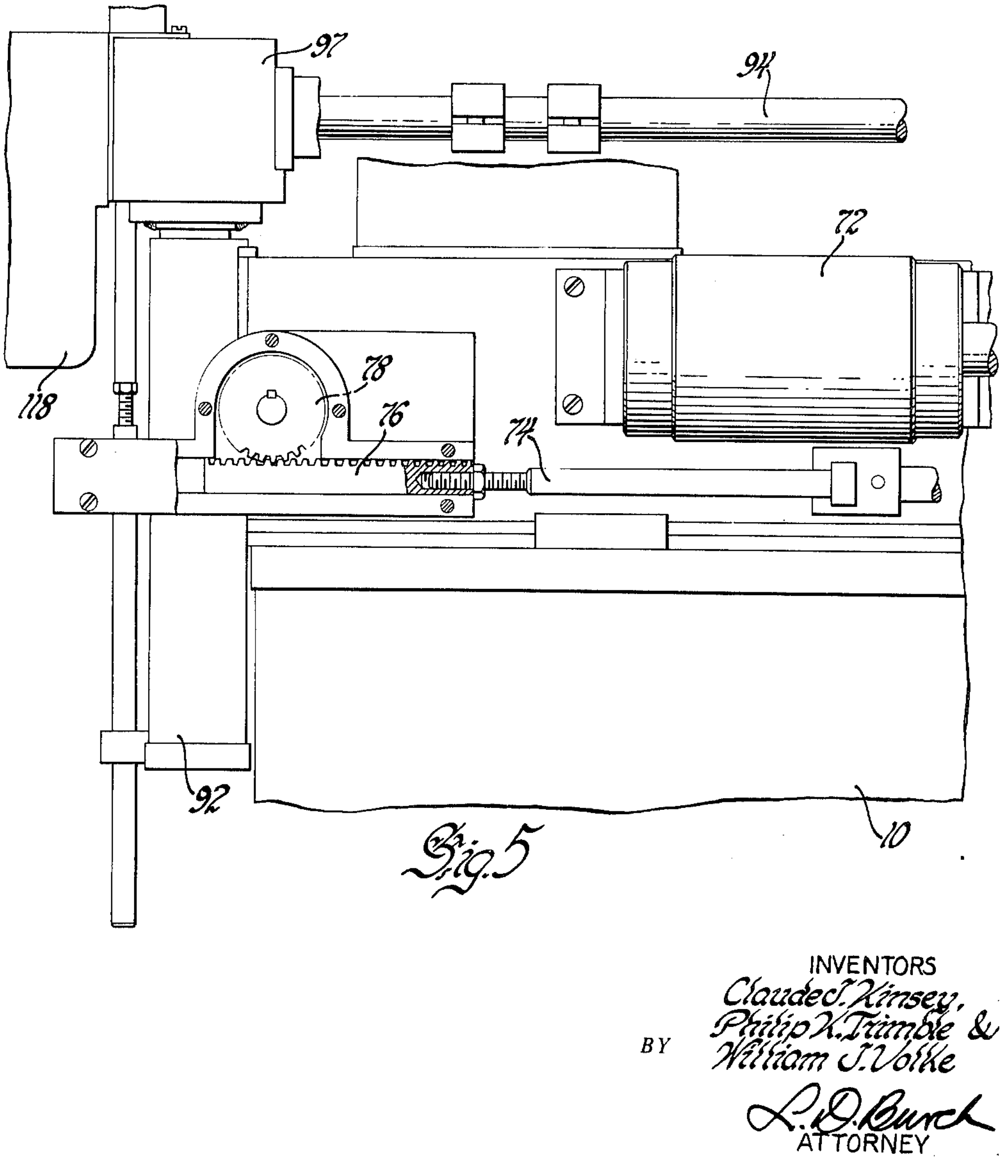
FIGURE 5 is an enlarged view of one end of the balancing machine as shown by FIGURE 4.
Figure 10:
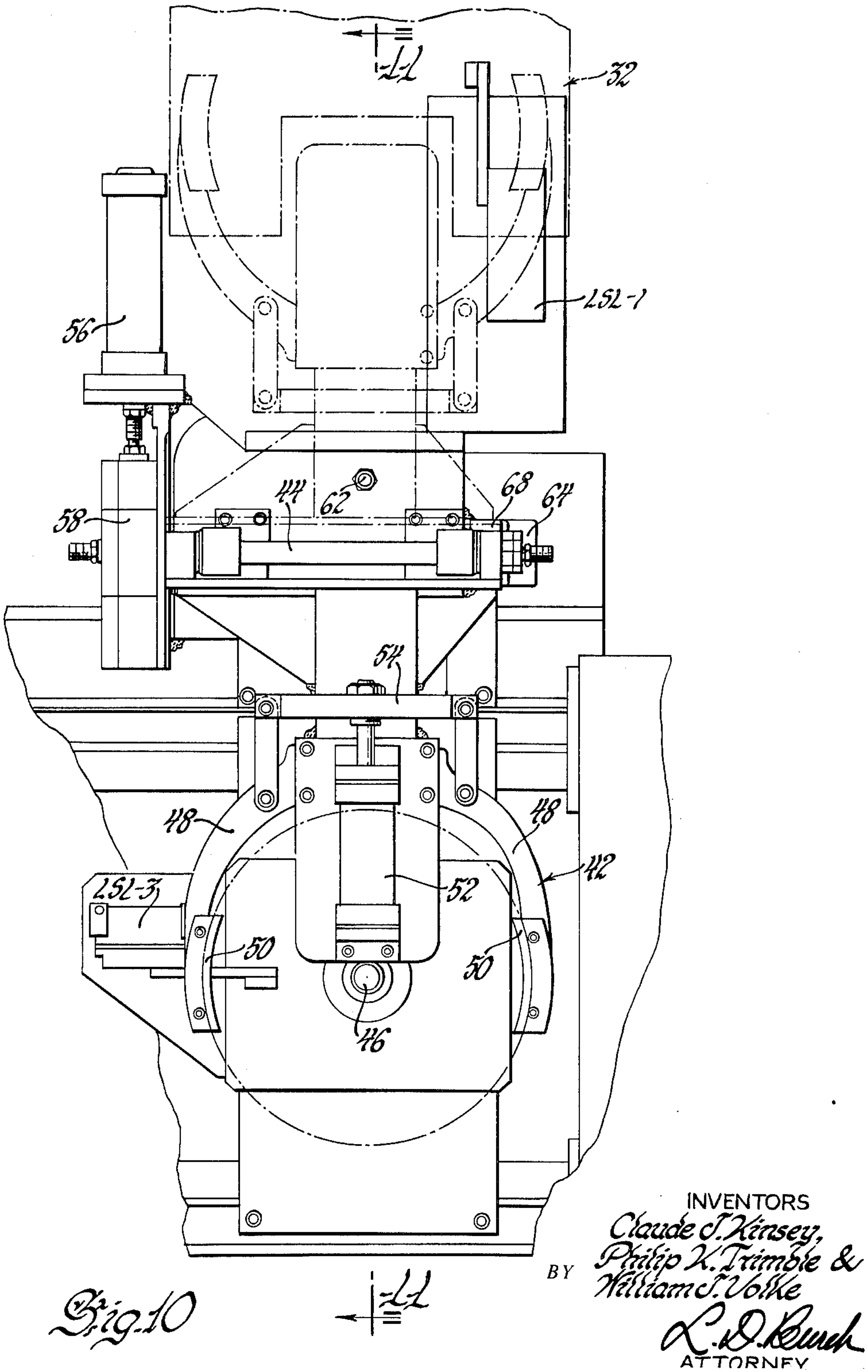

FIGURE 10 is an enlarged top plan view of the work loading means shown generally by FIGURE 2.

Figure 11:
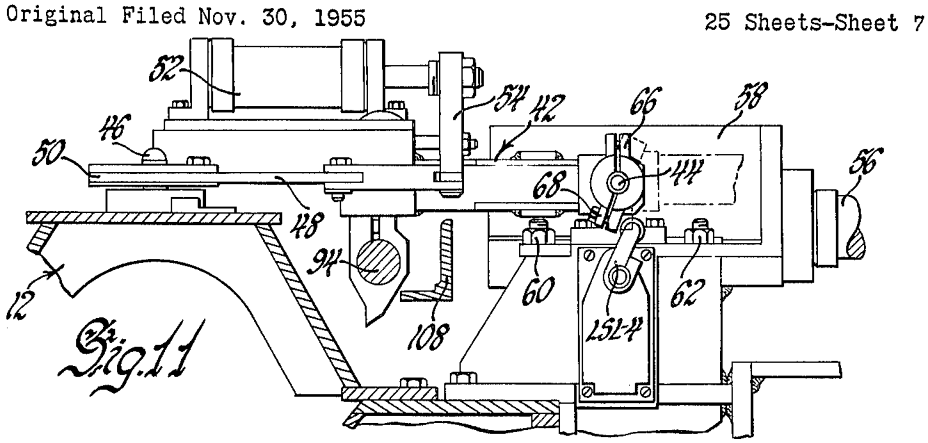

FIGURE 11 is a cross-sectional side view of the work loading means shown by FIGURE 10 as seen in the plane of line 11—11 looking in the direction of the arrows thereon.

Figure 12:
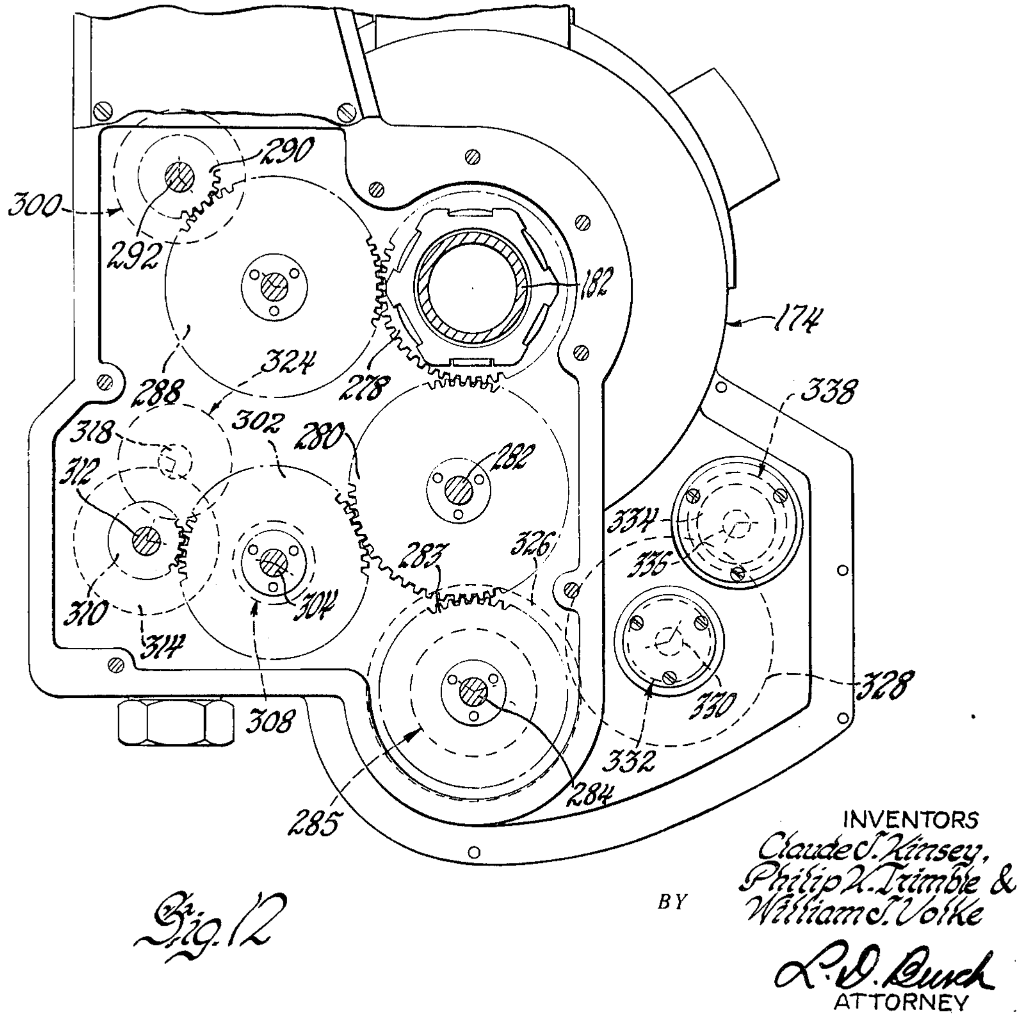

FIGURE 12 is a cross-sectional top view of the balancing station drive means.

Figure 13:
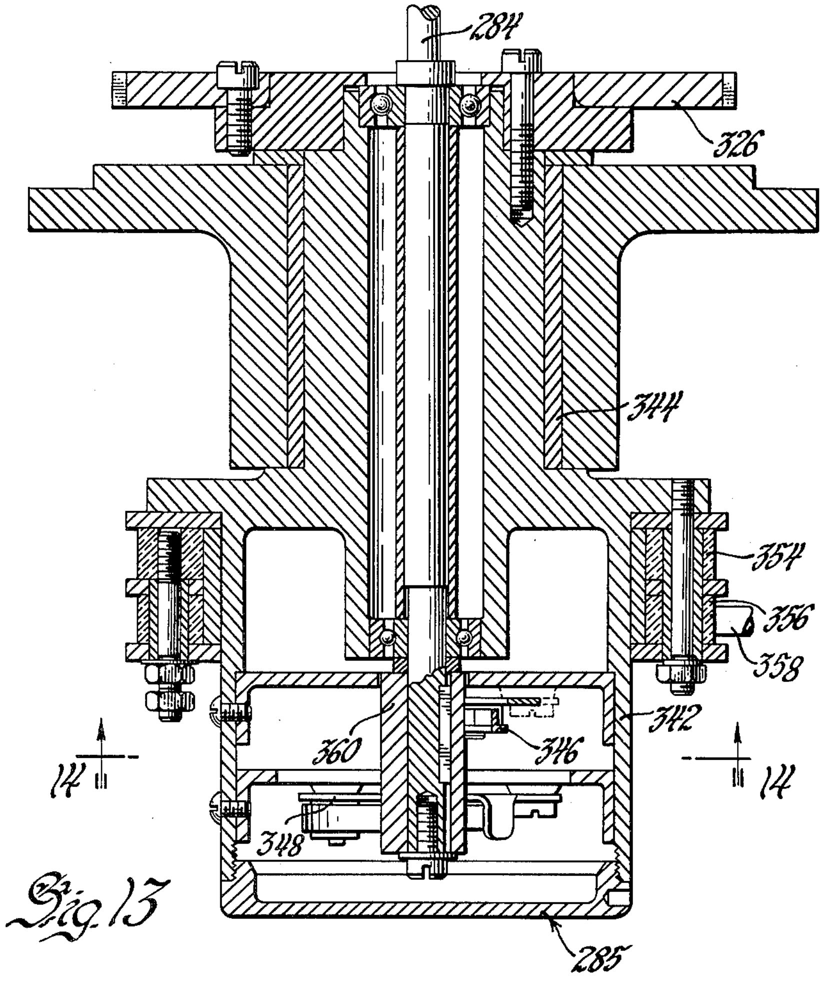

FIGURE 13 is an enlarged cross-sectional side view of part of the balance determinative means.

Figure 14:
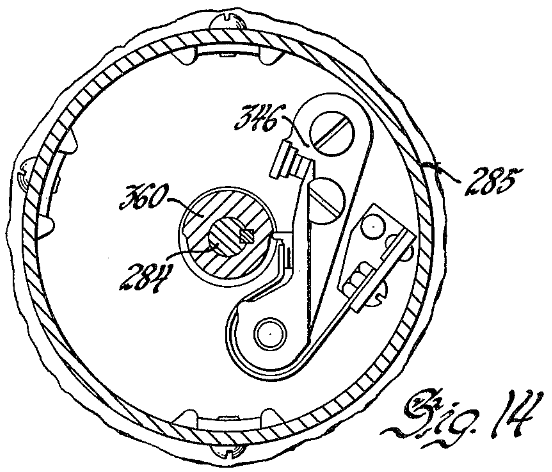

FIGURE 14 is a cross-sectional top view of the part of the balance determinative means of FIGURE 13 as seen in the plane of line 14—14 thereof, looking in the direction of the arrows.

Figure 15:
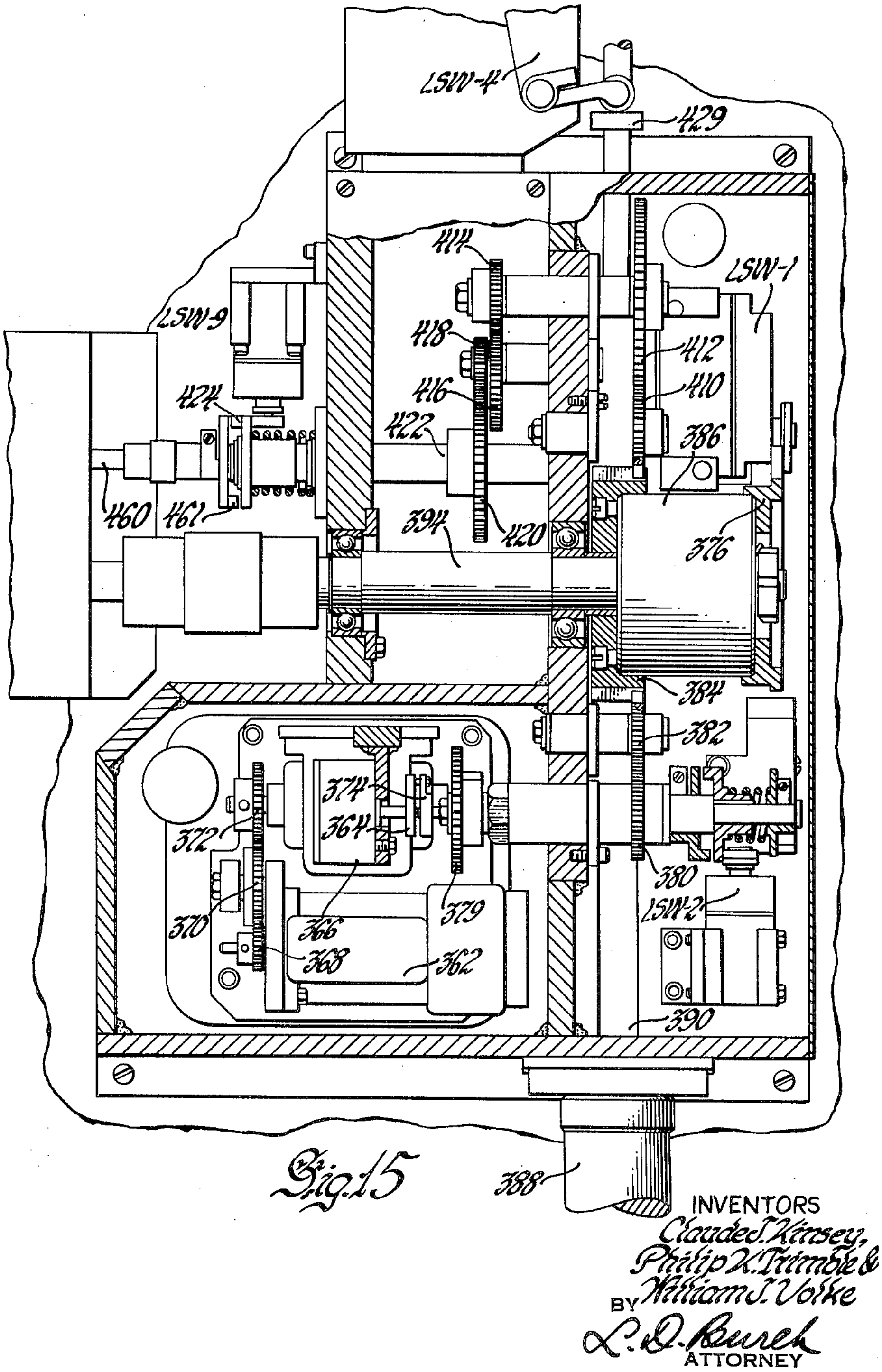

FIGURE 15 is a cross-sectional side view of the strip feed mechanism of the corrective station.

Figure 16:
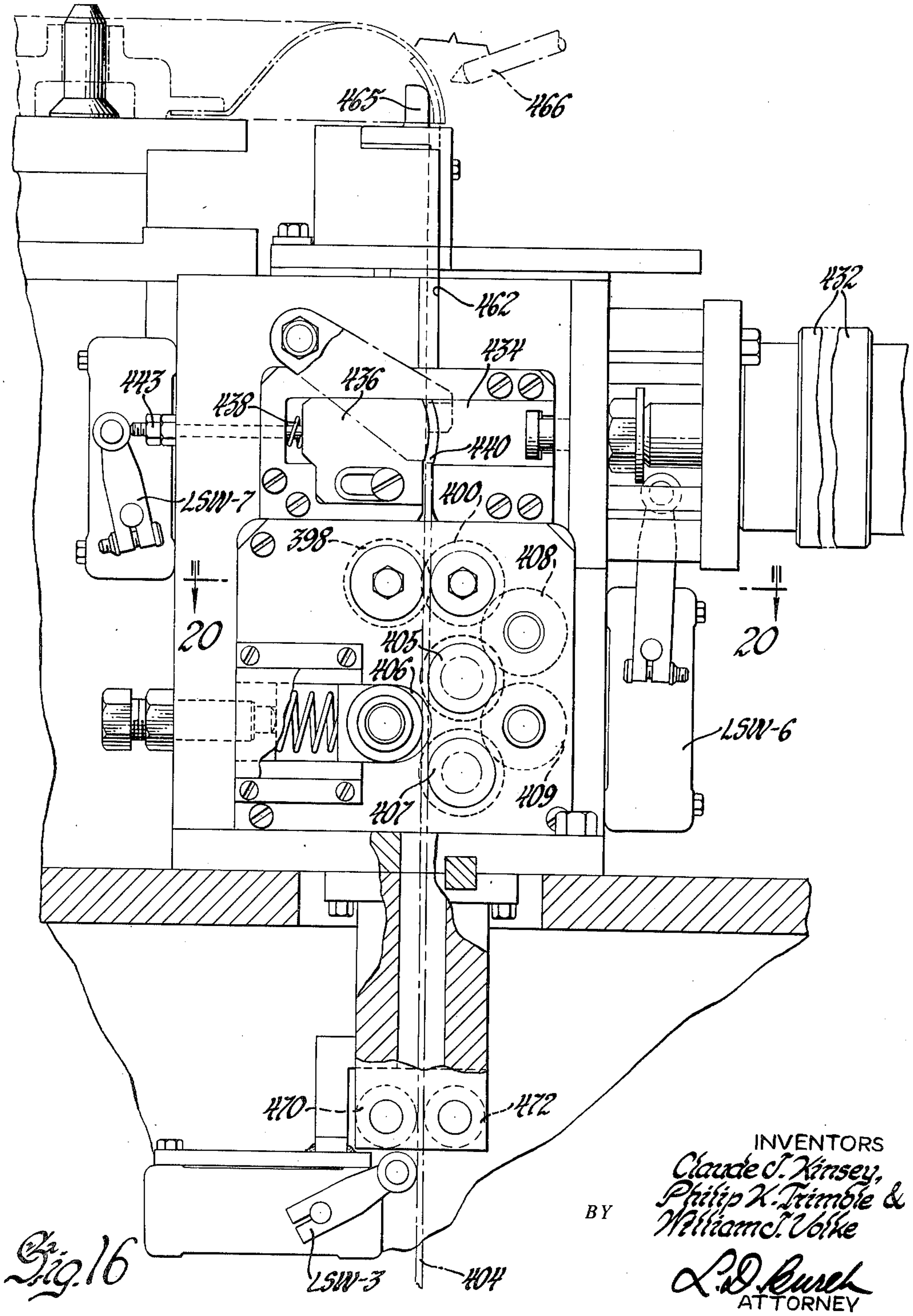

FIGURE 16 is a side view of the balance corrective station of the proposed balancing machine.

Figures 17, 18:
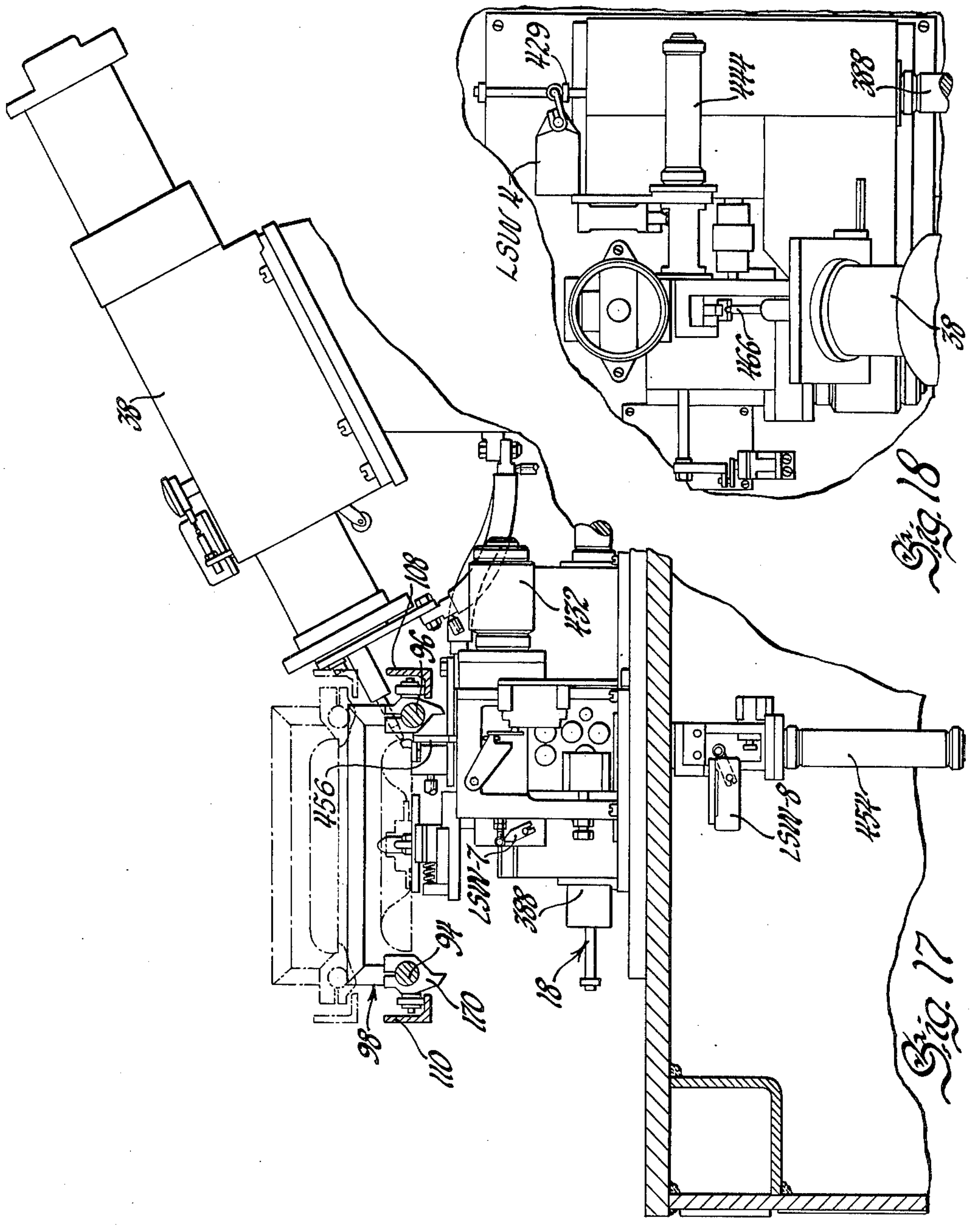

FIGURE 17 is an enlarged end view of the balance corrective station within the machine of FIGURE 2 as taken in the plane of line 17—17 and looking in the direction of the arrows thereon.

FIGURE 18 is a fragmentary enlarged top view of the balance corrective station shown in FIGURES 2 and 17.

Figure 19:
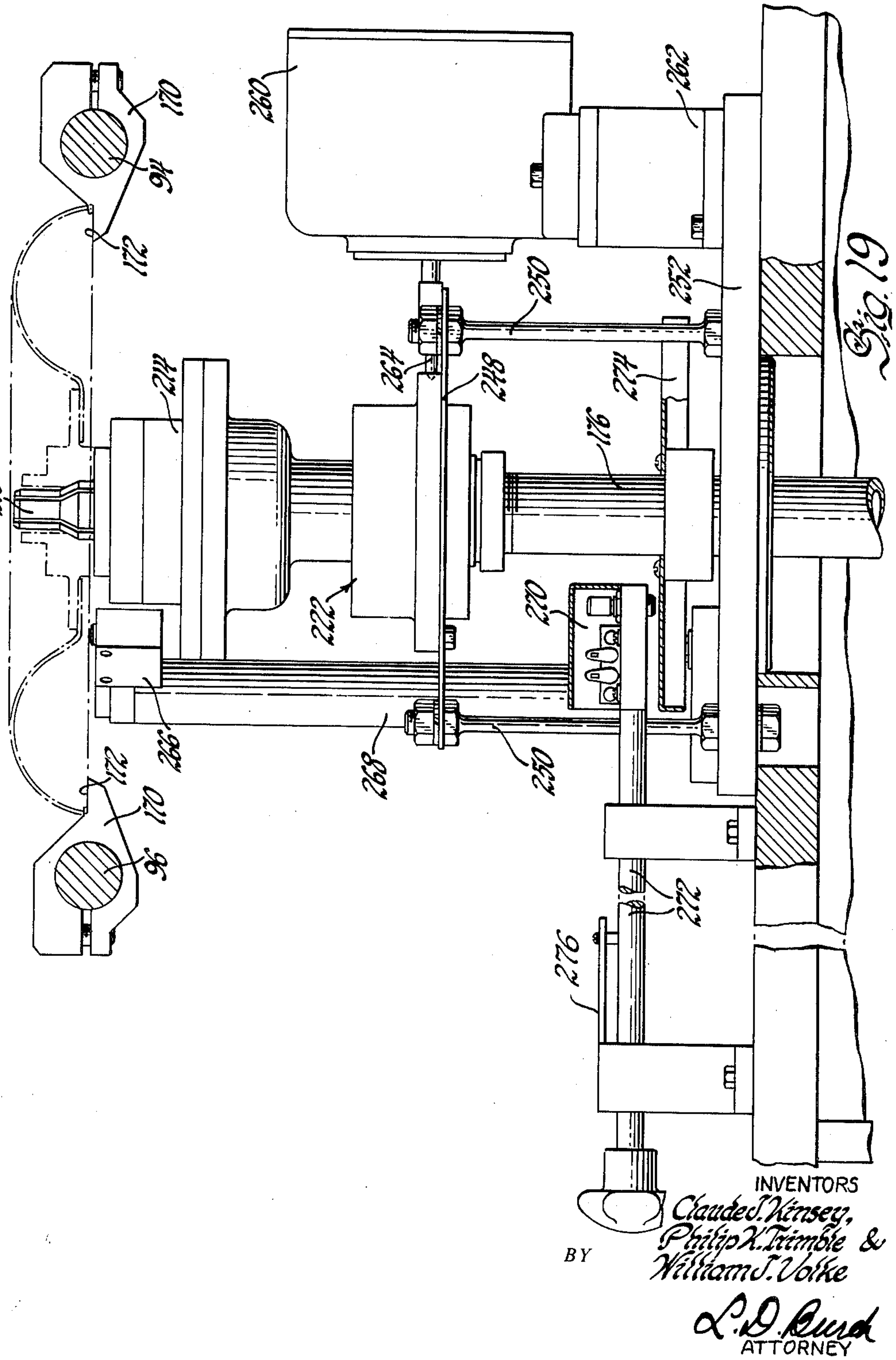

FIGURE 19 is a side view of the balance determinative stations showing the work receiving and balance detection means.

Figure 20:
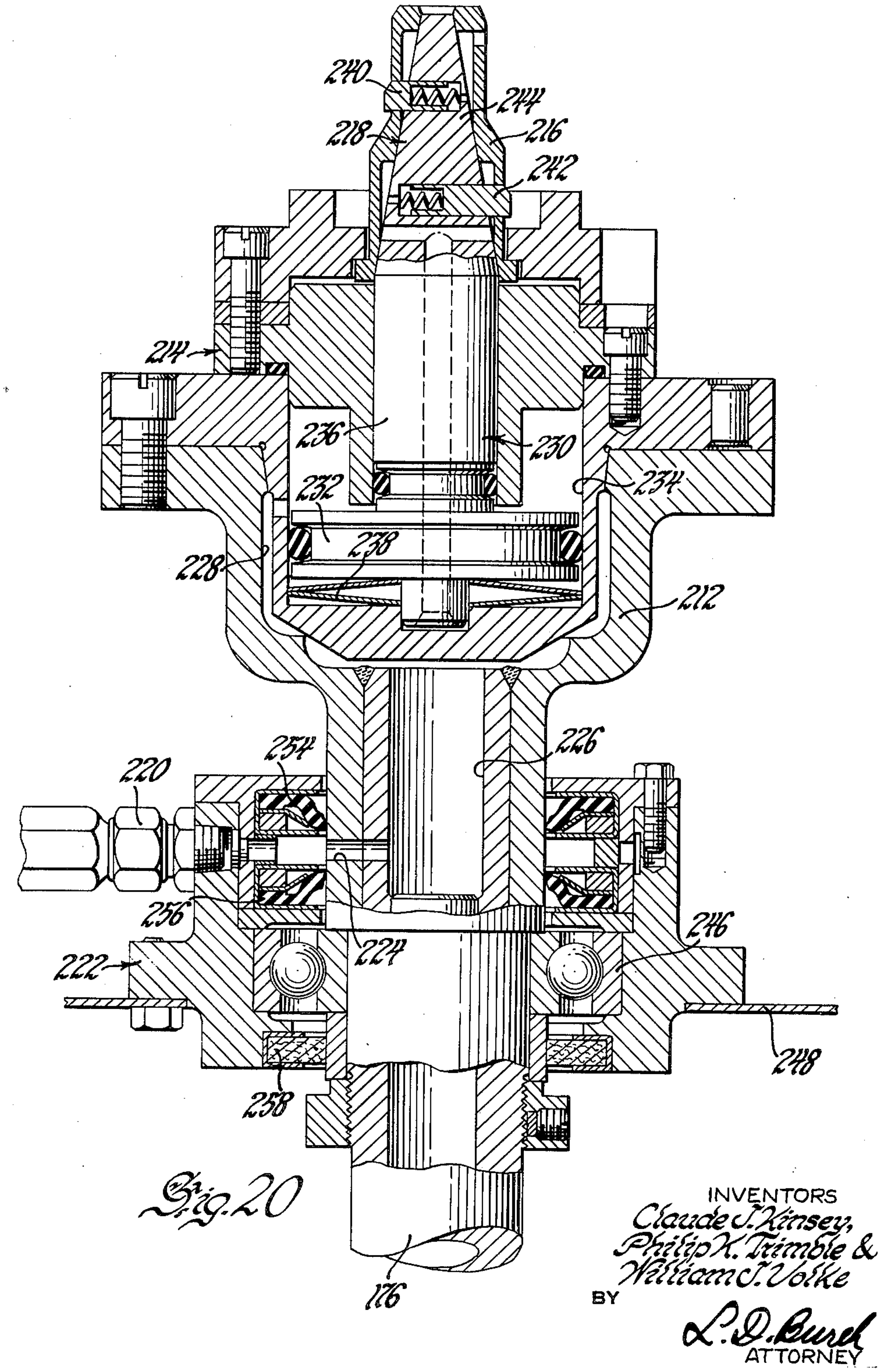

FIGURE 20 is a cross-sectional view of the work receiving means of the balance determinative stations.

Figures 21, 22:
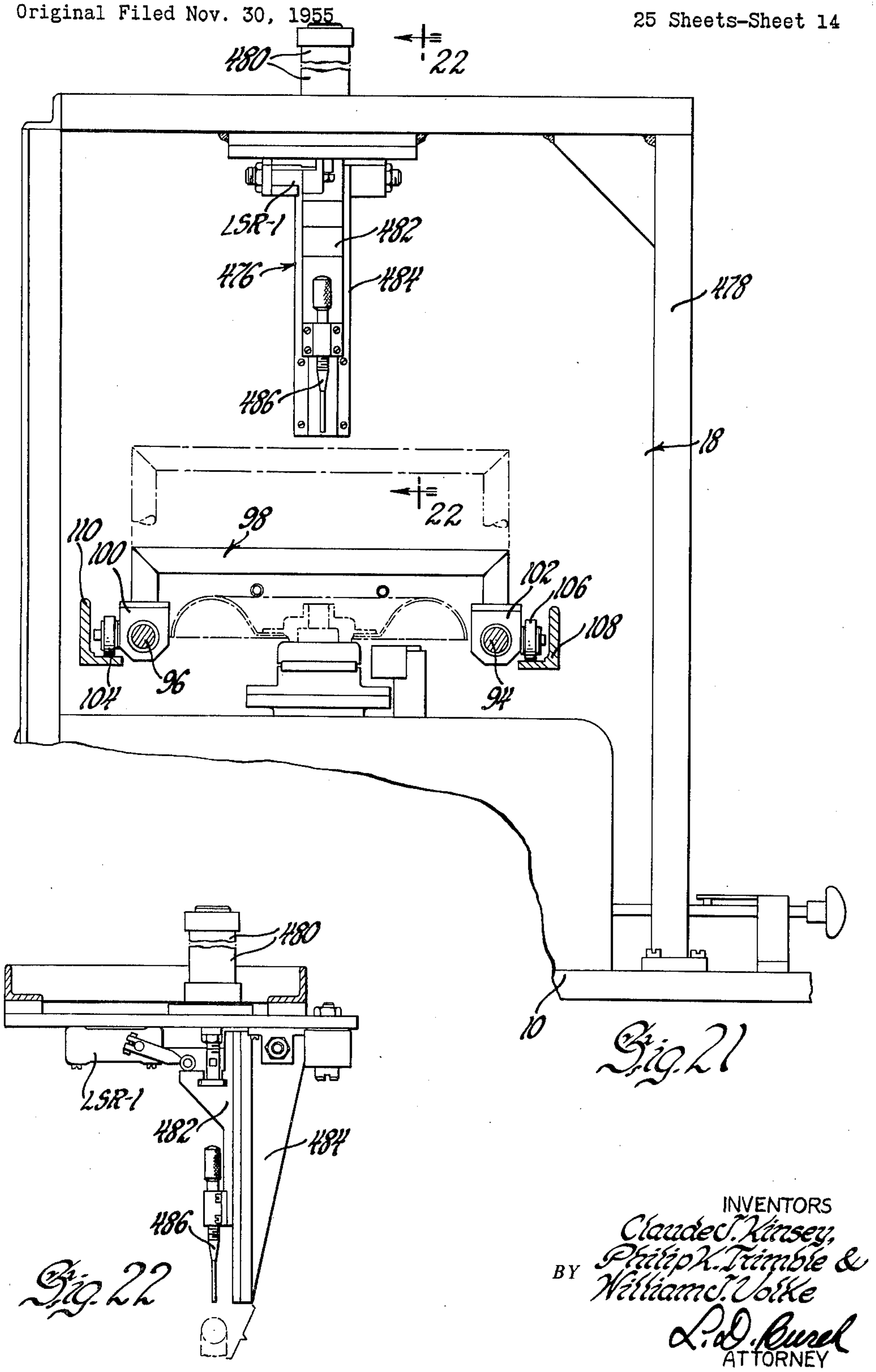

FIGURE 21 is an enlarged end view of the recheck station, showing the marker means, as taken in the plane of line 21—21 of FIGURE 2, looking in the direction of the arrows thereon.

FIGURE 22 is a side view of the marker means of FIGURE 21 as seen in the plane of line 22—22, looking in the direction of the arrows thereon.

Figure 23:
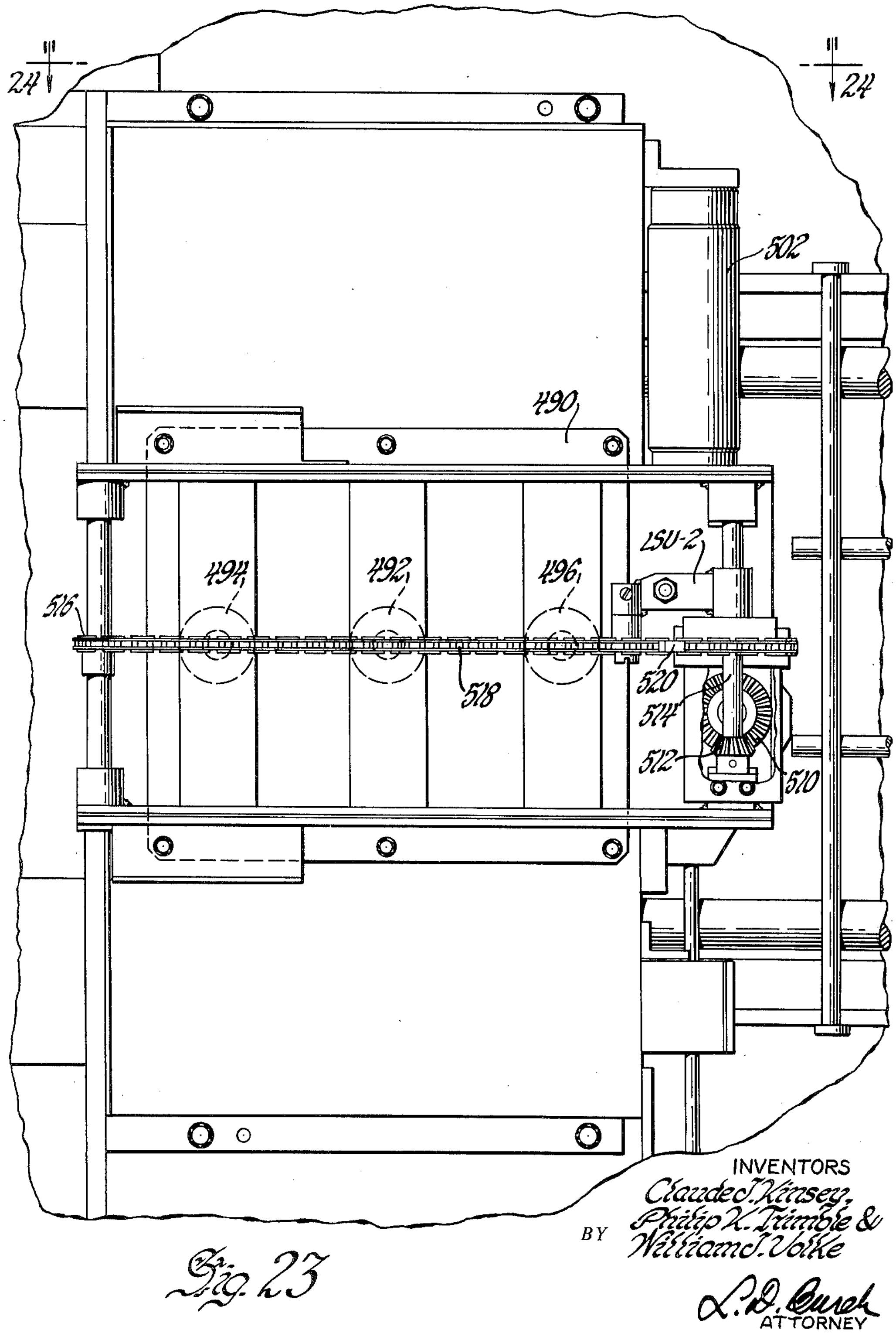

FIGURE 23 is a top plan view of the unloading station of the proposed balancing machine.

Figure 24:
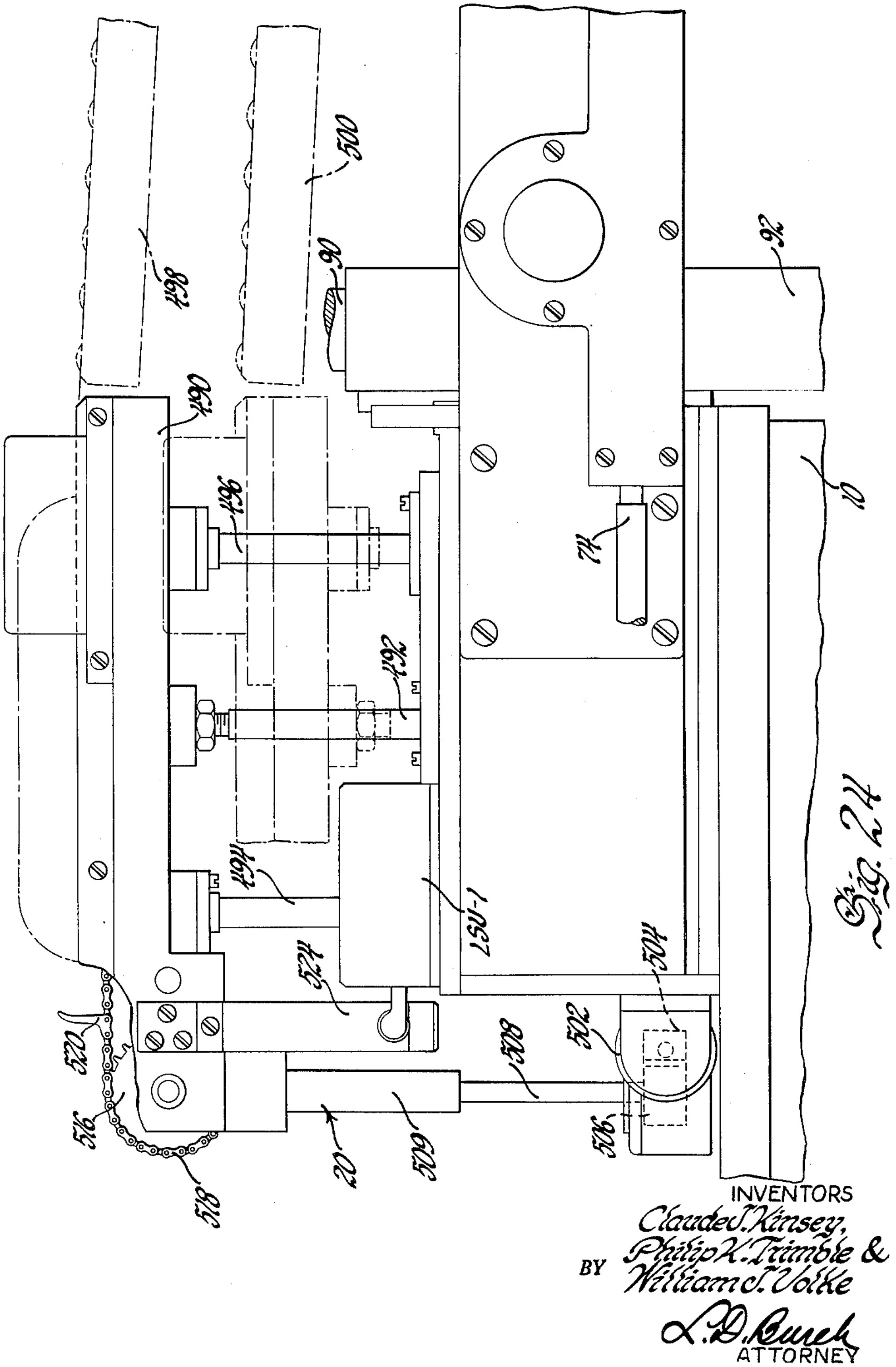

FIGURE 24 is a side plan view of the unloading station of FIGURE 23, as taken in the plane of line 24—24 and looking in the direction of the arrows thereon.

Figure 25:
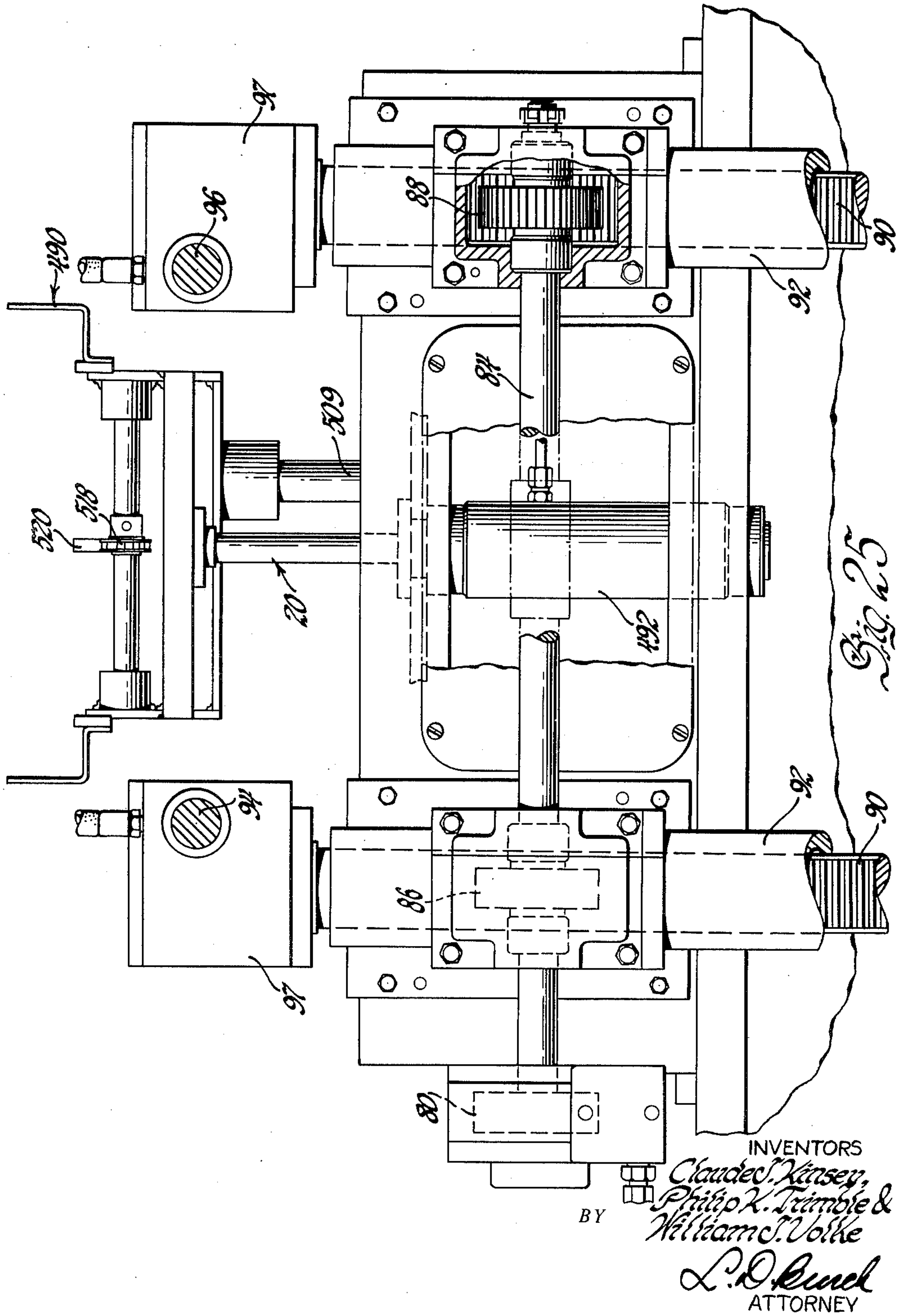

FIGURE 25 is an enlarged end view of the proposed balancing machine as taken in the plane of line 25—25 of FIGURE 2, looking in the direction of the arrows thereon.

FIGURES 26*a* through *g*, are of the electrical control system of the disclosed balancing machine.

The balancing machine shown by the drawings comprises a base member 10 housing the work station means of a loading station 12, balancing station 14, correcting station 16, recheck station 18, and unloading station 20. Access doors 22, 24 and 26 are provided for access to the balancing, correcting and recheck station means within the base member. Control panel boxes 28 and 30 are secured to base 10 as are other control means shown. A work feeding conveyor 32 carries work members to the loading station 12 and a shuttle bar work transferring means 34 moves the work members progressively from one work station to the next.

The work members shown are torus assemblies used in automatic vehicle transmissions and will be designated by the numeral 36. These torus members include torus shells required to have a plurality of vanes assembled therein prior to their arrival for balance determination and, consequently, are open upwardly as received at the balancing machine. In order to protect the vanes of the work member from injury and to provide a more stable balancing disposition, the work members are turned over upon being received, as will be described.

In brief, the balancing machine operations include loading work members onto a transfer means 34 at the loading station 12; receiving, clamping and rotating each work member for unbalance detection and determination and repositioning the work member in automatic accordance with the character of its unbalance at the balancing station 14; receiving and correcting for unbalance at the corrective station 16 in automatic accordance with the determinations made at the balancing station for each respective work member, as by use of the welding apparatus 38; repeating the detection and determinative operation of the balancing station 14 at the rechecking station 18 (following the correction for unbalance at the correcting station 16) and the marking of the member if accepted, as by marker means 476; and passing or rejecting the work members at the unloading station 20 in automatic accordance with the re-evaluation made at the recheck station 18.

The means for performing the operations just mentioned are all operatively interconnected to provide for the fully automatic inspection and correction of work members received thereby as will now be described in greater detail.

The work loading means of loading station 12 is shown in detail by FIGURES 10 and 11 to include pivotally mounted work jaw means 42, rotatable about a pivot shaft 44 between the work feeding conveyor means 32 and an upright work receiving and centering spindle 46. The work jaw means 42 include pivotally mounted forked arms 48 having work engaging shoes 50 provided upon their outer ends, and which are opened and closed by piston cylinder means 52 operating through a mechanical linkage 54 connected to arms 48. Piston cylinder 56 operating through a rack and gear means within housing 58 rotate the pivot shaft 44 and turn over the work jaw means 42 between the dotted and full line positions shown, while stop means 60 and 62 limit the travel of the jaw means and switch means LSL–4 is actuated by lugs 66 and 68 on the pivot shaft to signal the ready condition or completion of work loading, respectively. Ready switch means LSL–1 are also provided to indicate the disposition of a work member on the feed conveyor 32 for work loading.

Figure 26:
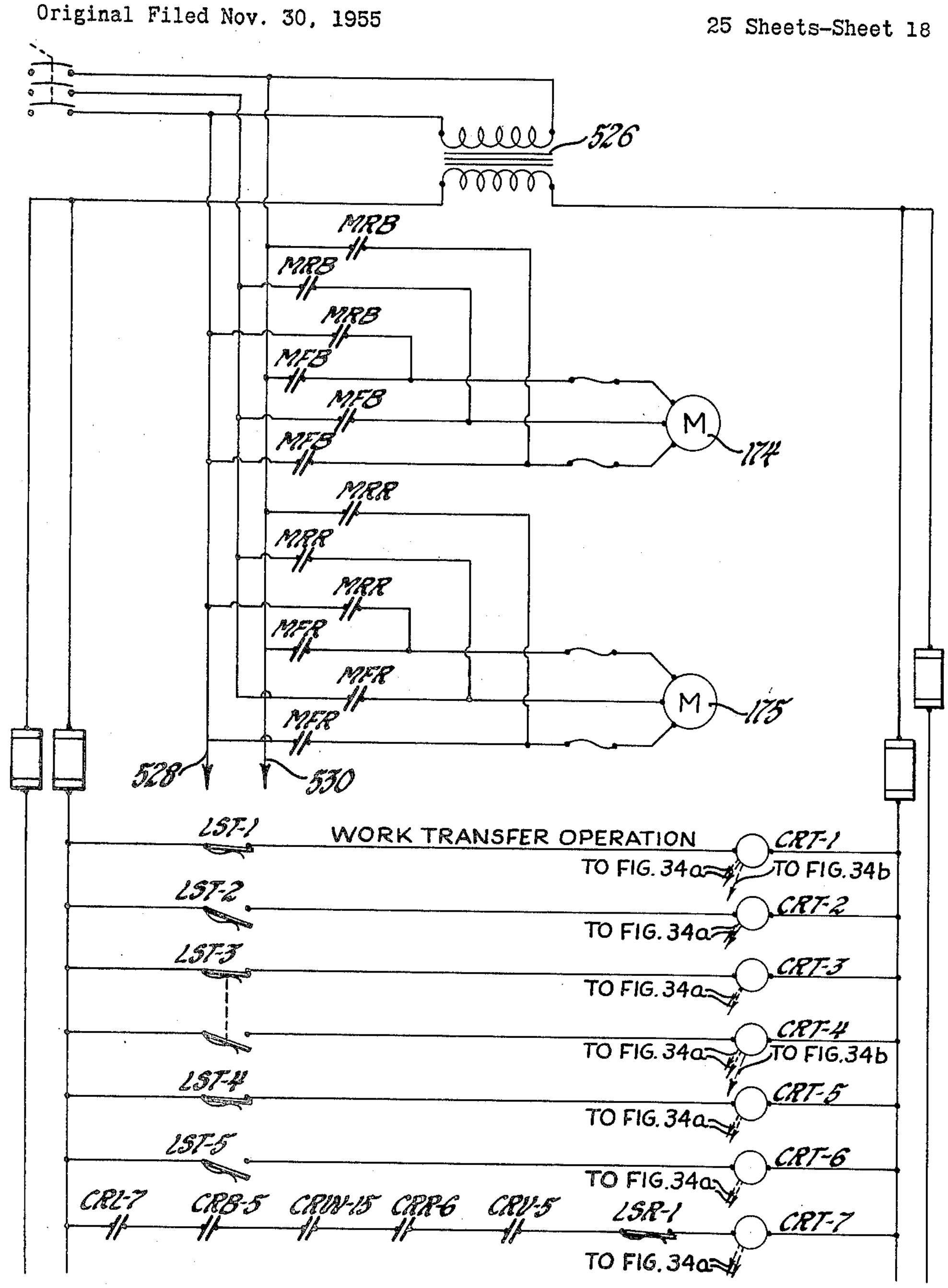
Figure 26A:
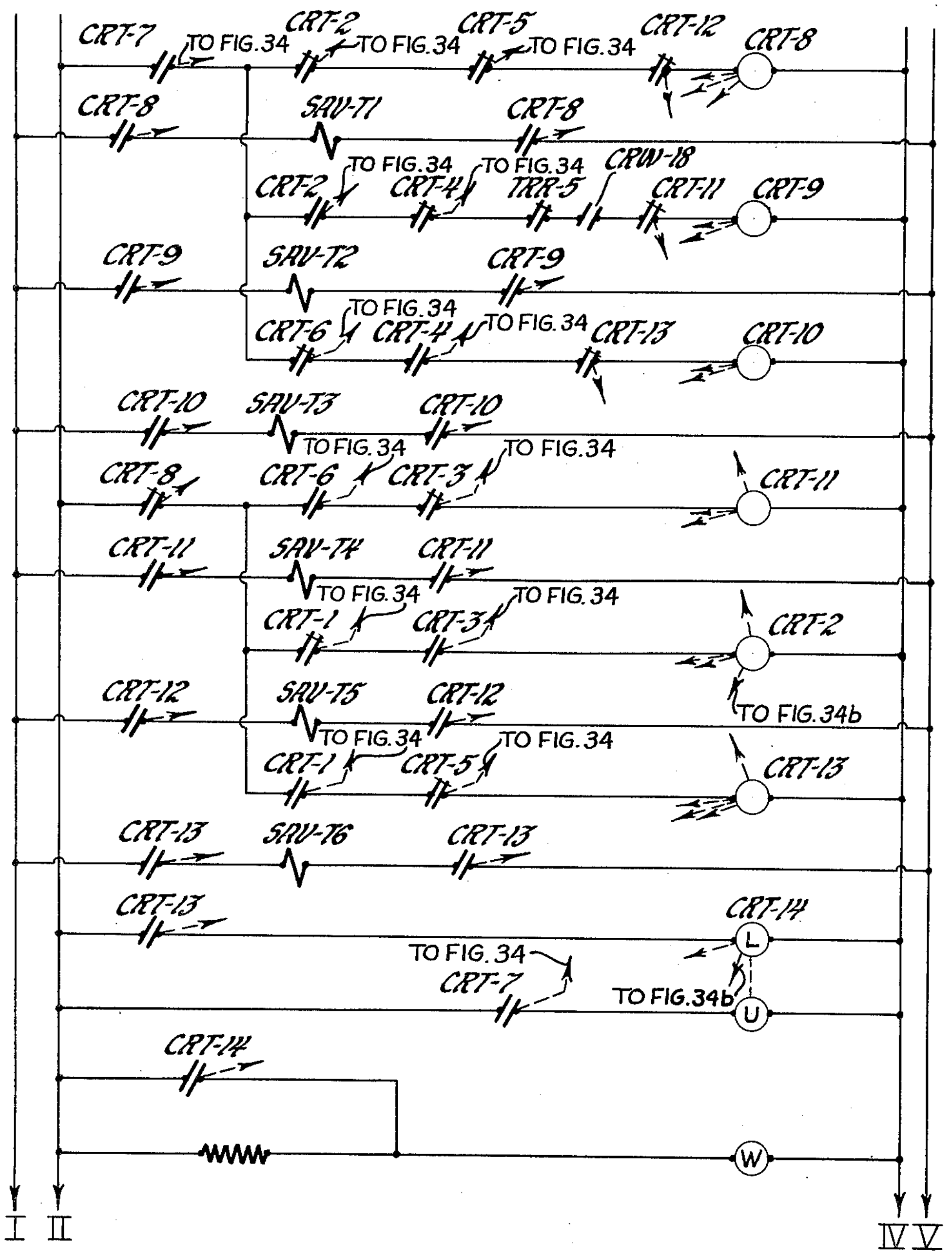
Figure 26B:
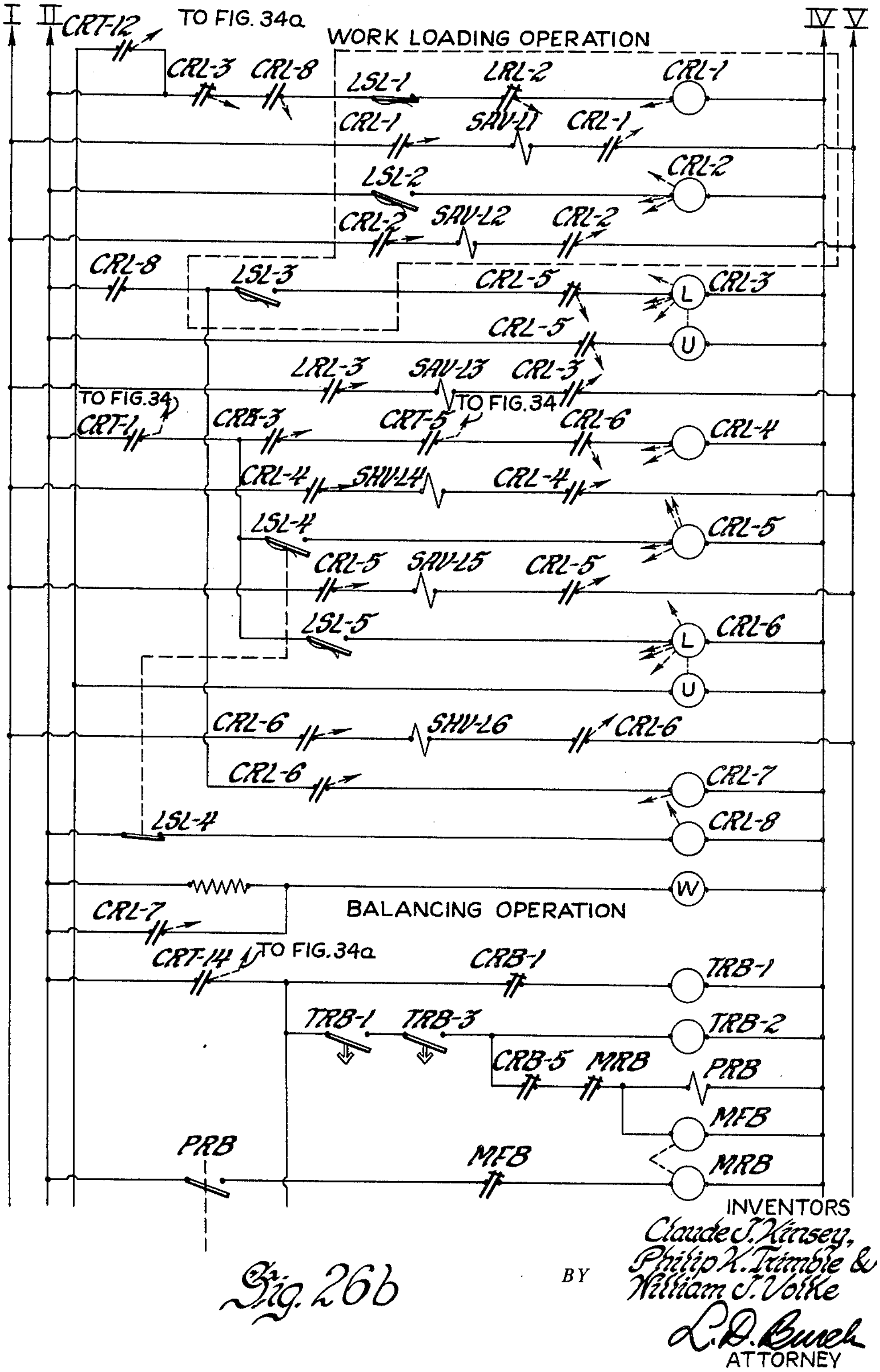
Figure 26C:
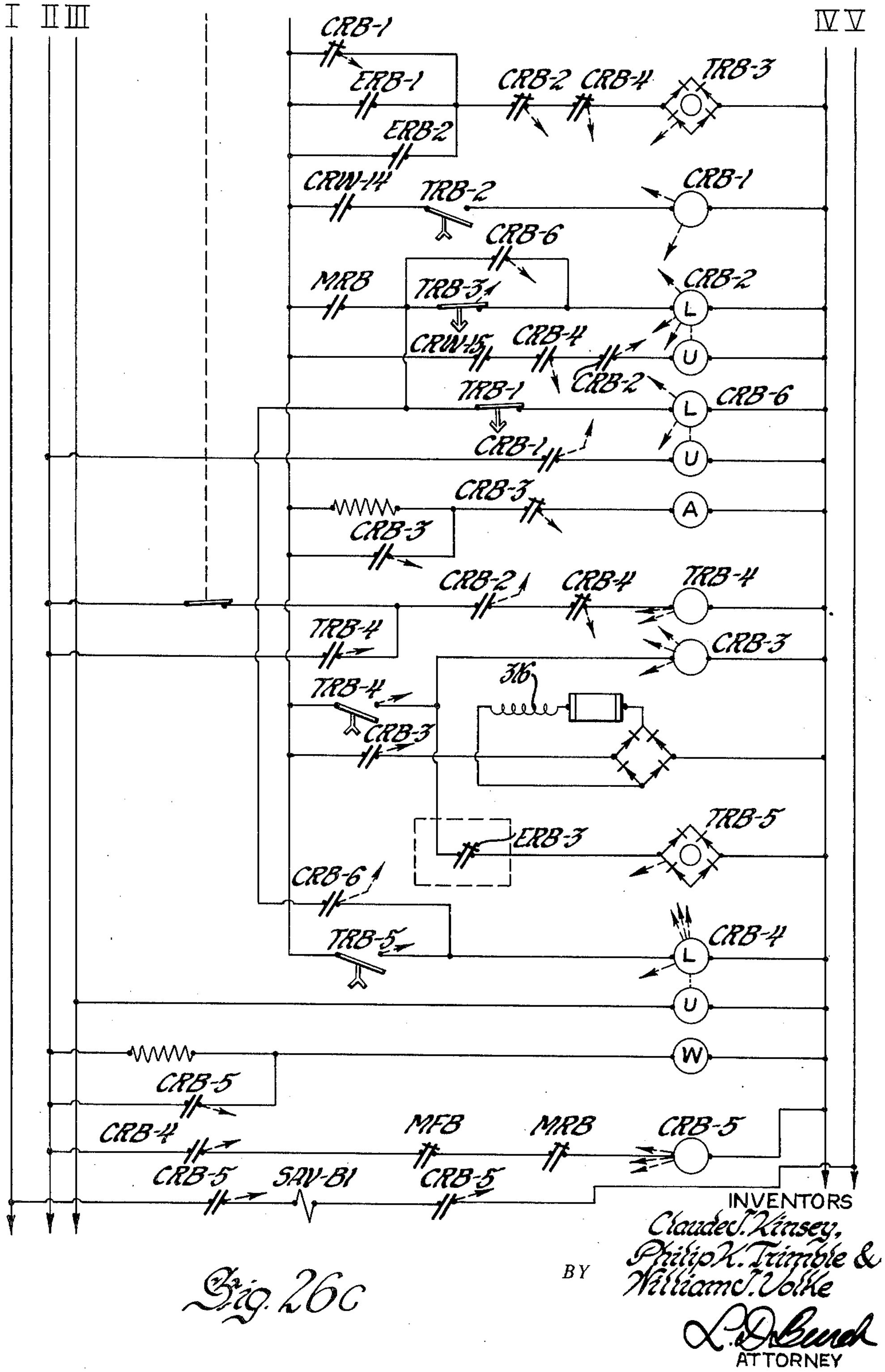

Piston cylinder means 52 include solenoid control valves SAV–L3 and SAV–L5 for opening and closing the work jaws 48, and piston cylinder means 56 includes solenoid control valves SAV–L4 and SAV–L6 for actuating a forward and return stroke of the jaw means 42; reference FIGURE 26*b*.

The work loading means 42 disposes work members 36 upon the loading station spindle 46 from which they are transferred to the other work station by transfer means 34 shown in detail by FIGURES 4 through 9 and FIGURE 25.

Piston cylinder means 72 is operatively connected to an axially movable bar 74 having rack bars 76 secured to opposite ends thereof. The rack bars 76 engage pinions 78 and 80 which are secured to rotatable shafts 82 and 84 at opposite ends of the machine base 10 and have pinions 86 and 88 secured to each and spaced apart on opposite sides of the balancing machine. Each of the pinions 86 and 88 engage a vertical rack bar 90, disposed in a housing 92 and supporting one end of one of a pair of rotatable transfer bars, 94 and 96, within a journal bearing housing 97. The transfer bars 94 and 96 extend the length of the balancing machine, over all of the work stations and are in parallel spaced relation to eoch other. Because of their length, the transfer bars are supported centrally by carriage means 98, shown by FIGURES 17 and 21, which includes a cross brace 99, journal bearings 100 and 102, within which the transfer bars are rotatable, and side rollers 104 and 106, which engage and ride upon channeled side rails 108 and 110 extending the length of the balancing machine at the work receiving level of the work stations.

Figure 1:
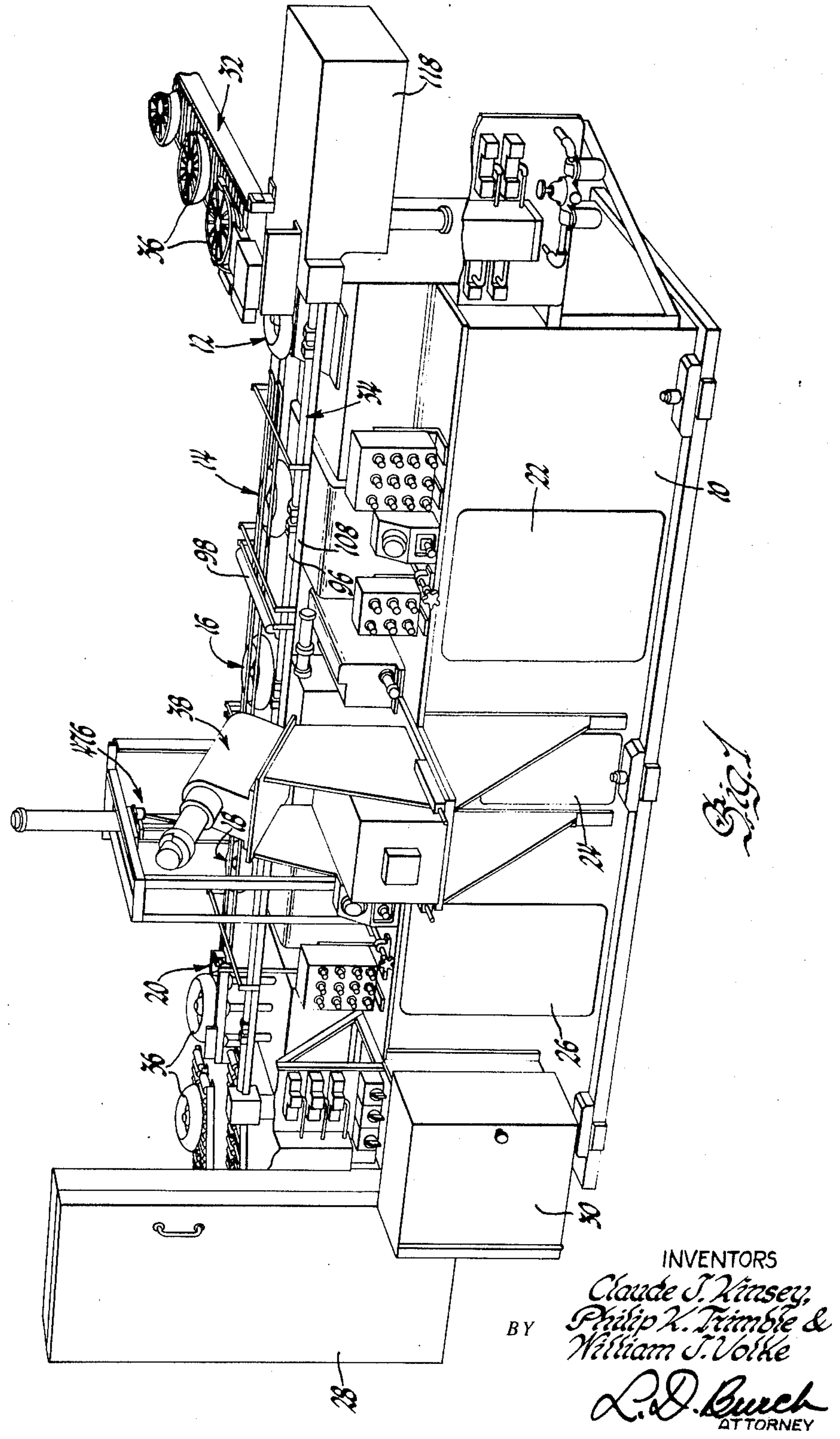
FIGURE 1 is a side perspective view of the proposed balancing means included within a machine for balancing torus parts of an automatic transmission unit.

Besides being capable to vertical movement, the transfer means 34 are movable longitudinally by the use of piston cylinder means 112 secured to the transfer means and includes a connecting end 114 which is secured to a tie plate 116 having the transfer bars 94 and 96 secured thereto, as best seen by FIGURE 2. These members are preferably disposed within a protective housing such as 118 shown in FIGURE 1.

As mentioned, the transfer bars 94 and 96 are also rotatable. Such rotation is effected by piston cylinder means 120 having a rack bar 122 connected thereto. The rack bar engages a pinion 124 secured to transfer bar 94 and one of a pair of idler pinions 126 and 128; the latter being engaged with a pinion 130 secured to the other transfer bar 96. The idler pinion arrangement is to provide for simultaneous opposite rotation of the transfer bars. The pinions 124 and 130 are keyed to transfer bars 94 and 96, respectively, to permit their axial movement, as by key means 132 and 134 and keyways 136 and 138, respectively; reference FIGURES 7 and 9. The idler pinions 126 and 128 are keyed to an idler shaft 140, reference FIGURE 8.

Switch means are provided to signal the position of the transfer means 34 as follows: A depending rod 142 is secured to the cylinder means 112 and includes collars 148 and 146 which engage and actuate limit switch means LST–3 as the transfer means are raised or lowered. Limit switch means LST–4 and LST–5 are disposed for engagement by collar means 154 or pin means 156 secured to transfer bar 96 as the transfer means are moved longitudinally. And limit switch means LST–1 and LST–2 are disposed for engagement by lug 162 on a collar 166 secured to transfer bar 94, as by key means 168 in keyway 136 thereof, to indicate the rotational disposition of the transfer bars.

Rotatable fingers 170 are secured in pairs to each of the transfer bars 94 and 96, at spaced intervals. The fingers of opposite transfer bars extend towards each other to support work members 36 as best shown by FIGURE 19. The ends of adjacent fingers are relieved, as at 172, to form a pocket for receiving the work members as shown by FIGURE 2. The pairs of fingers are spaced in accordance with the spacing of the work stations between which they are adapted to travel during the longitudinal movement of the work transfer means 34.

The work receiving fingers 170 are up as the work transfer cycle begins. The transfer bars 94 and 96 are simultaneously raised causing the fingers to lift the work members from their respective stations, are moved towards the next succeeding work station, and are lowered to dispose a work member at the next succeeding station, after which the transfer bars are rotated to drop the fingers (as shown by FIGURE 17) and the transfer bars are then returned to their initial position ready to be rotated to raise the work receiving fingers and repeat the work transfer cycle. The piston cylinder means 72, 112, and 120 are actuated, respectively, by solenoid valves SAV–T3 and SAV–T6 to advance and return the transfer means, solenoid valves SAV–T2 and SAV–T4 to raise and lower the transfer bars, and solenoid valves SAV–T1 and SAV–T5 to rotate the transfer fingers up and down; reference FIGURE 26*a*.

The balancing station 14 is positioned next adjacent to and in line with the loading station 12 for receiving work members 36 transferred therefrom.

The balancing station is basically a Rotating Static Balancer including a vertically mounted hollow spindle drive motor 174 having a spindle 176 pivotally mounted therein at its lower end, as per FIGURE 12, and adapted to receive a work member upon the other end thereof, by means shown in FIGURE 20.

The drive motor 174 includes a rotatably supported hollow spindle shaft 182. The work supporting spindle 176 is suitably pivotally mounted within the lower end of the shaft 182.

Referring next to FIGURE 20, the upper end of the work receiving spindle 176 includes a flanged member 212 secured thereto and forming part of the work receiving and clamping means 214. Work members to be inspected are adapted to be received over the centering collet 216 which has work clamping means 218 disposed therein. Air supply and exhaust means 220 are connected through a collar 222 to supply air through passage means 224, formed through the flanged member 212 and spindle 176, to the work clamping means 218 via passages 226 and 228. The work clamping means 218 includes a piston member 230 having a piston head 232 disposed within the chamber 234, which receives pressurized air from the air supply and exhaust means 220, and a shank 236 extending within the centering collet 216. The piston member 230 is biased upwardly by Belleville spring means 238. Spring loaded detents 240 and 242 provided in the conical end 244 of the shank 236 engage spline teeth in the work member to keep the work member from rotating on the work receiving means 214. The Belleville spring 238 holds the collet in a work engaging position and air pressure, acting through passage means in piston shank 236, releases the work engaging means after the spindle rotating means has stopped.

The upper end of the spindle 176 is journaled within bearing means 246 of the collar member 222. The collar member is secured to a triangular plate 248 flexibly mounted on tie rods 250 secured to a base plate 252 of the balance station, as shown in FIGURE 19. Such flexible mounting permits universal freedom of movement for the upper end of the work receiving spindle 176 as necessary in the determination of the unbalance characteristics of work members supported thereon, as will be described. The collar member also includes air seals 254 and 256 and a dirt seal 258 about the spindle 176.

Unbalance detection means 260, shown in FIGURE 19, is mounted upon a support 262 secured to the base plate 252 and includes a probe 264 engaging the collar member 222. Such means will be further described later.

Means 266 for sensing the initial disposition of a work member upon the balancing spindle 176 are supported by a post 268 upon the end of spindle 176 in close spaced relation to the expected position of the workpiece. Such sensing device is for the purpose of signaling the receipt of a work member on the balancing spindle 176 and for other purposes which will be later described.

The disclosed balancing station 14 also includes means for finding the angular disposition of unbalance in manually checking the spindle 176 for balance. Such means include a pickup 270 radially adjustable by control means 272 relative to a disk or collar 274 secured to the balancing spindle 176, with a calibrated scale 276 provided to regulate the positioning of the pickup device.

Within the base 10 at the balancing station 14 is disposed gear trains and control members forming a part of the balancing station.

Referring to FIGURE 12, gear means 278 is provided upon the drive motor shaft 182 and is engaged with an idler gear 280 connected to a shaft 282, which in turn engages a gear member 283 of shaft 284 that drives the contacts of the variable phase contactor 285 through connector means (not shown), as will be described later. The gear means 278 is also connected through an idler gear 288 with gear means 290 of shaft 292 which is operatively connected to a zero speed control motor 300; the purpose of which will be described later.

A gear member 302 is driven by the idler gear 280 and is secured to a shaft 304, which controls a synchro transformer 308 for purposes to be later described. The gear 302 transmits drive to a gear 310 secured to a shaft 312 which drives a gear 314 secured to the same shaft. The gear 314 drives a gear 318 secured to shaft means 320 which is connected to a spindle repositioning motor 324.

A gear member 326 is secured to the housing of the variable phase contactor means 285 and is engaged with a gear 328 secured to a shaft 330 which controls a synchro transmitter 332 through connection means 335. The gear 328 engages a gear 334 of shaft 336 which is operatively connected to a control motor 338 through a speed changer 340.

The variable phase contactor means 285 is adapted to coordinate the electrical circuits of the balance station 14 with the rotating shaft 182 of the drive motor (which has the work receiving spindle 176 rotated therewith). The contactor means, FIGURES 13 and 14, includes a cylindrical housing 342, rotatable by gear means 326 on an oil impregnated bearing bushing 344, and two sets of automobile distributor contacts 346 and 348 disposed 90° out of phase. The contact points are suitably connected through slip rings 354 and 356 and brush contactors, as 358, to suitable rectifier relay means to be mentioned. Cam means 360 secured to the end of shaft 284 actuate the contacts 346 and 348.

The control motor 338 with its associated gear train 334, 328, 326 will turn the variable phase contactor housing 342 until the unbalance location of the work member under inspection is determined and in so doing will set up the rotor of the control transmitter 332 through gear 328 and its shaft 330.

The main drive spindle 182, after it has been rotated during the balance determinative cycle, is plugged to a stop by the zero speed control motor 300 acting through its gear train 290, 288 and 278. Thereafter the spindle repositioning motor 324 is adapted to reposition the main drive spindle 182 through gear 318, gears 310, 302, 280 and 278. A voltage signal is supplied to the spindle repositioning motor 324 from the control transmitter 332 which actuates the repositioning motor until the rotor of the control transformer 308 is aligned with the rotor of the control transmitter 332; the rotor of the control transformer being driven by the spindle repositioning motor 324 through gear 302 and its shaft 304.

The work receiving spindle 176 being connected to the main drive shaft 182, causes the spindle to be indexed relative to the variable phase contactor housing 342 such that the side opposite the unbalance of the work member is positioned relative to the corrective means 38 of the correcting station 16 prior to work transfer from the balance station 14.

Amplitude detection, as angle, employs the magnetic pickup device 260 which includes a movable coil within a strong magnetic field such that motion of the coil in the magnetic field generates an electrical current having a frequency equal to the rotational speed of the work member and an amplitude directly proportional to the amplitude of the eccentric motion of the work receiving spindle 176 caused by the particular unbalance in the work member under inspection.

Correction station 16 is next adjacent to the balancing station 14 and includes means automatically responsive to the determinations made at the balancing station for correcting unbalanced work members.

The voltage signal is received by a servo motor 362 which is adapted to position the arm 364 of the potentiometer 366 through a train of gears 368, 370 and 372 until the voltage signal received by the servo motor has been nullified. Drive means 374 engaging the potentiometer arm 364 are adapted to rotate a single lobe cam 376 through gears 378, 379, 380, 382, 384 and a one-way clutch 386 to position the cam whose angular travel is proportional to the amplitude of unbalanced correction required.

Correction is accomplished by welding a measured strip of material to the work member. The measurement of the required amount of strip material is by means of piston cylinder 388, actuated after cam 376 has been rotationally positioned, to move a rack bar 390 connected thereto and engaged with the gear 384, to rotate the shaft 394 until the lobe of cam 376 actuates limit switch means LSW–1. The limit switch LSW–1 acts to deenergize piston cylinder 388.

Friction feed rollers 398 and 400 driven by shaft 394, having the gear 384 and cam 376 operatively connected thereto through the clutch 386, are appropriately geared together to feed and measure the proper amount of corrective material 404 (see FIGURE 16) which is required The material 404 is fed through serrated feed rollers 405, 406 and 407 which straighten and align the material as it is metered out. The feed rollers are driven by idlers 408 and 409.

In the course of measuring the required corrective size of a piece of material 404 to be applied to the work member the gear train comprising gears 410, 412, 414, 416, 418 and 420 rotate shaft 422 to position a cam 424 thereon. The rotational travel of shaft 422 and lug 424 is a measure of the size of a corrective slug which has been measured off and, as will be seen, is a measure of the distance for travel necessary to center the corrective slug relative to the work member.

Limit switch means LSW–2 is disposed for actuation when the unbalance detecting is below the minimal requirement for correction. Actuation of the switch LSW–2 signals other control means of the correcting station to remain immobile. Switches LSW–4 and LSW–9 are disposed for actuation as by collar 429 on the end of rack bar 390 and the axial movement of cam 424 on the centering control means, respectively, to signal the excessive unbalance of a work member beyond the capacity of the corrective means.

At the completion of the operative step of measuring out the required amount of corrective material, piston cylinder means 432 is actuated to move a combination shear and form die 434 operatively connected thereto (see FIGURE 16) against a form die 436 biased by spring means 438, to cut off and form a corrective slug 440 to the shape of the part of the work member to which it is to be secured; here with the curvature of the torus shell. Switch means LSW–7 are disposed for engagement by means 443 connected to the form die 436 to signal the completion of the cutoff and forming operative step and switch means LSW–6 signal the return of the cutoff die 434.

Referring particularly to FIGURE 17, a piston cylinder 444 is actuated, following the cutoff and forming of a slug 440, to move the slug by appropriate guide means to a position over vertical positioning means 454. The vertical positioning means include a rack bar 456. The rack bar 456 is operatively engaged with the shaft 460, which shaft includes a cam 461 driven to the rotational position of cam 424 on the centering means.

The slug 440 remains in the vertical transfer channel 462 until required to be positioned relative to the work member for which it has been measured. The end of the rack bar 456 is adapted to move the slugs through the guide means 462 to a center position in relation to the electrodes 465 and 466 of the welding device 38. The bar 456 holds the slug 440 in position until the pressure of the welding gun is applied; at which time the piston cylinder means of the corrective station are all signaled to their original positions. The switch means LSW–8 (see FIGURE 17) signal the raised or lowered position of the vertical transfer bar.

Figure 26D:
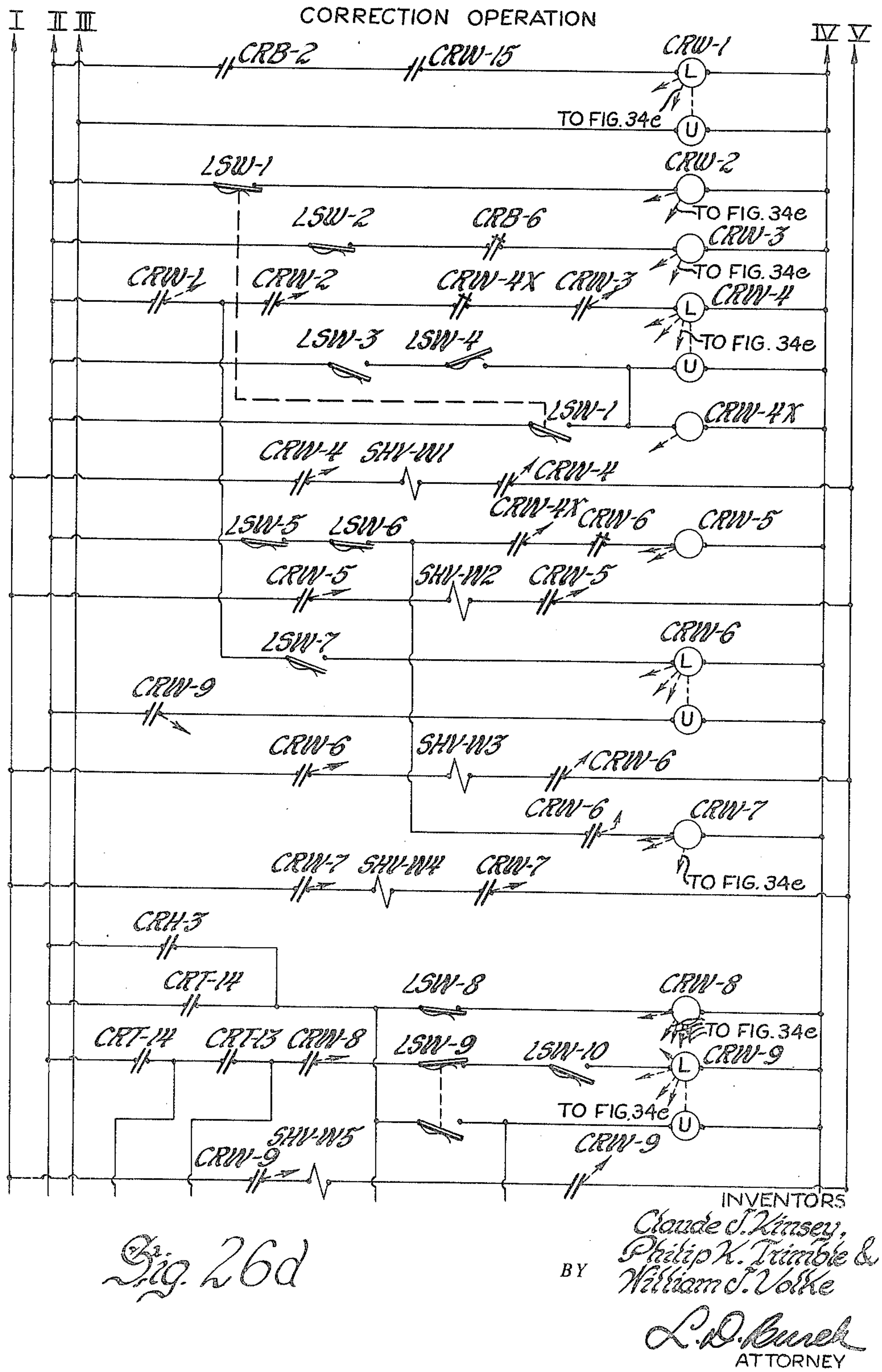
Figure 26E:
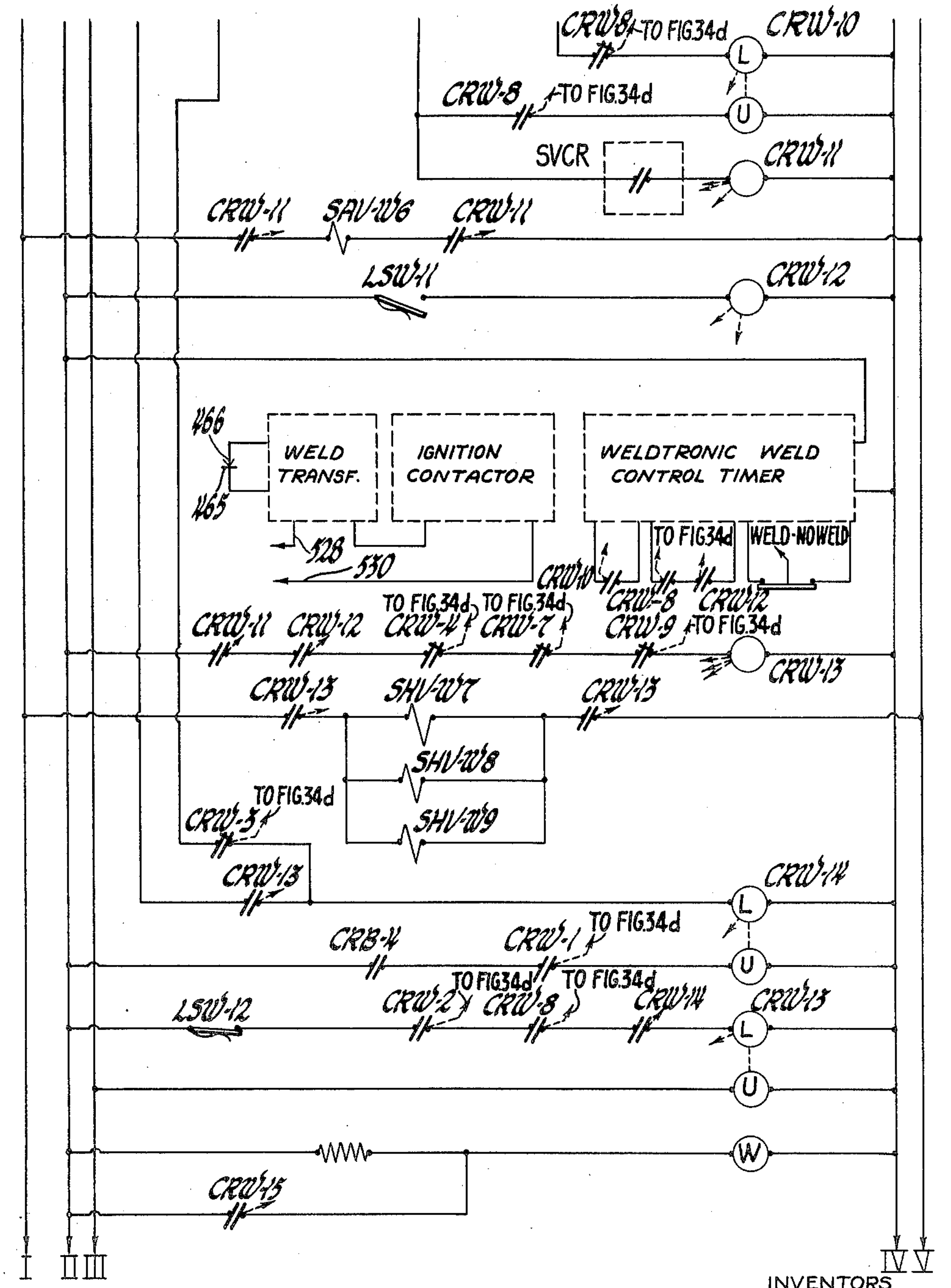
Figure 26F:
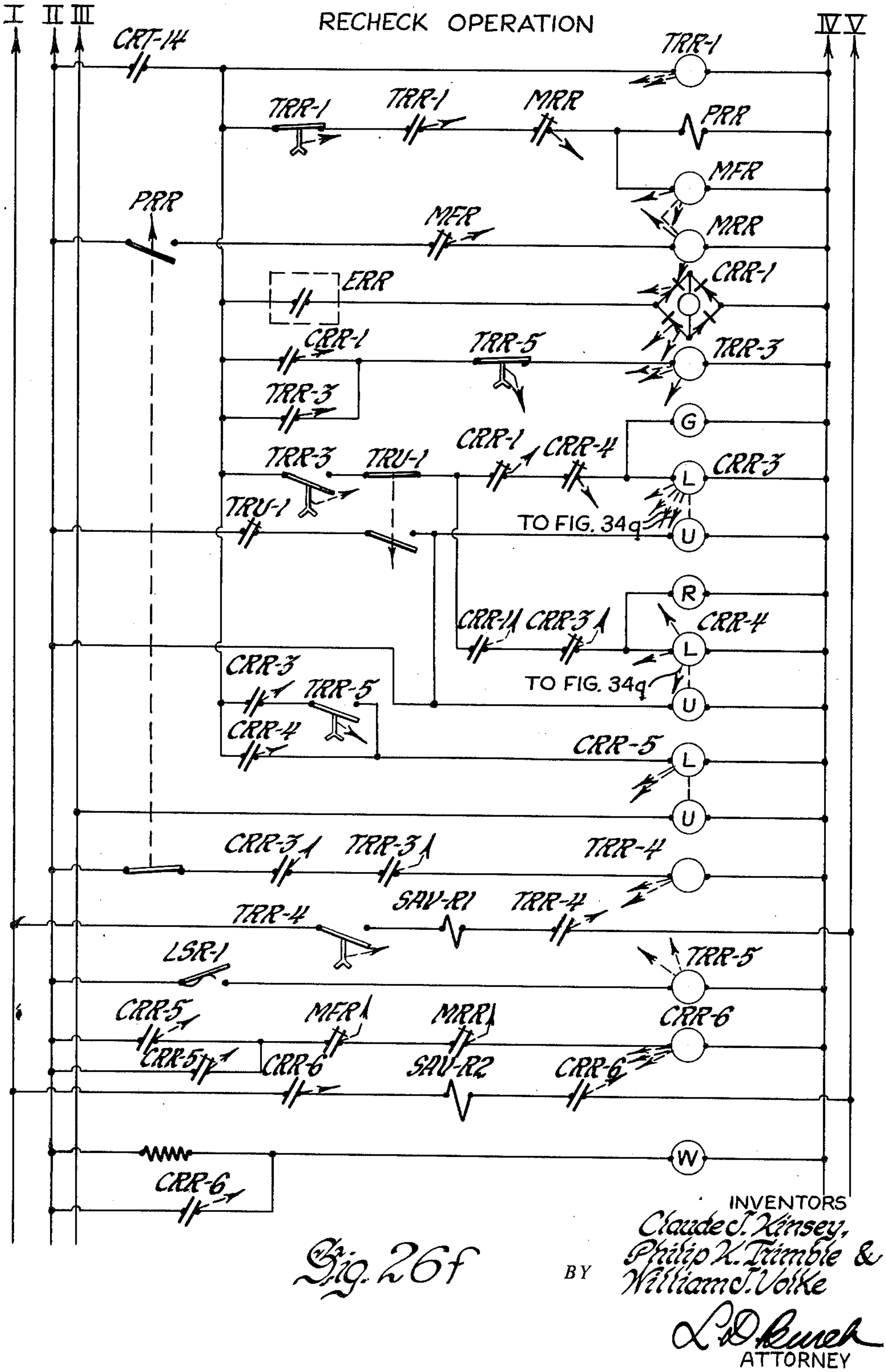

Piston cylinder means (not shown) are controlled by solenoid valves SHV–W1 and SHV–W7 to advance and return the strip feed rack bar 390, solenoid valves SHV–W2 and SHV–W3 to advance and return the cutoff and form die 434, solenoid valves SHV–W4 and SHV–W8 to advance and return the piston cylinder 444, and by solenoid valves SHV–W5 and SHV–W9 to raise and lower rack bar 456; reference FIGURES 26*d* and *e*.

In FIGURE 16 the rollers 470 and 472 are shown as initial guide means for the strip material and the switch LSW–3 is to signal the presence of available strip feed material.

The balance recheck station 20 is next adjacent to the correcting station 16 and includes the balance detecting and determining means of the balancing station 14 which have already been described. Since these stations are principally the same, further drawings as to the operative means of detecting and determining the unbalance character of a work member are not considered necessary. Distinct and separate drive means 175 are used for the recheck station as shown in the electrical drawings.

In addition to other features of the balancing station 14 the recheck station 18 includes marking means 476 for stamping each work member found to have acceptable unbalance limitations. A framework 478 secured to base 10 over the recheck station 18 supports piston cylinder means 480. The piston cylinder means 480 is controlled by solenoid valves SAV–R1 and SAV–R2, reference FIGURE 26*f*, and has a carrier 482 operatively connected thereto and guided on a depending support 484. A punch member 486 is secured to the carrier and is vertically moved therewith to engage and mark the work member disposed at the recheck station provided such work member is within acceptable unbalance limitations. Limit switch means LSR–1 secured to the frame work 478 are disposed to engage the carrier 482 to signal the completion of the marking of a work member and a withdrawal of the carrier.

The unloading station 20 is next adjacent to the recheck station 18 and is the last station of the disclosed machine assembly. The unloading station includes means adapted to transfer work members it receives to an "accepted" or "rejected" level of the conveyor system.

The unloading station includes an ejector platform or table 490 which is vertically movable by piston cylinder means 492, connected thereto, and which is guided by vertical guide means 494 and 496. The two positions of the platform 490 are shown in FIGURE 24 as that of acceptance, with the platform up and aligned with an acceptance conveyor 498, and rejection, with the platform down and aligned with the reject conveyor means 500.

In the raised position, the ejector platform is aligned with the conveyor work transfer means 34 and, consequently, is required to be lowered to the reject position only when a signal from the recheck station 18 indicates a work member is not within prescribed balance limitations.

The work ejecting means of station 20 includes piston cylinder means 502 which controls a rack bar 504 engaging the gear 506 secured to a shaft 508. Rotation of the shaft 508, which is spline connected to another shaft within the housing 509, rotates the bevel gear 510, meshing with bevel gear 512, to rotate shaft 514 having a sprocket wheel 516 secured thereto. An endless chain 518, engaged by the sprocket wheel 516, extends the length of the table or platform 490 and includes an ejector tooth or finger 520, normally disposed behind the position on the platform where the work member will be deposited by the transfer means 34.

Figure 26G:
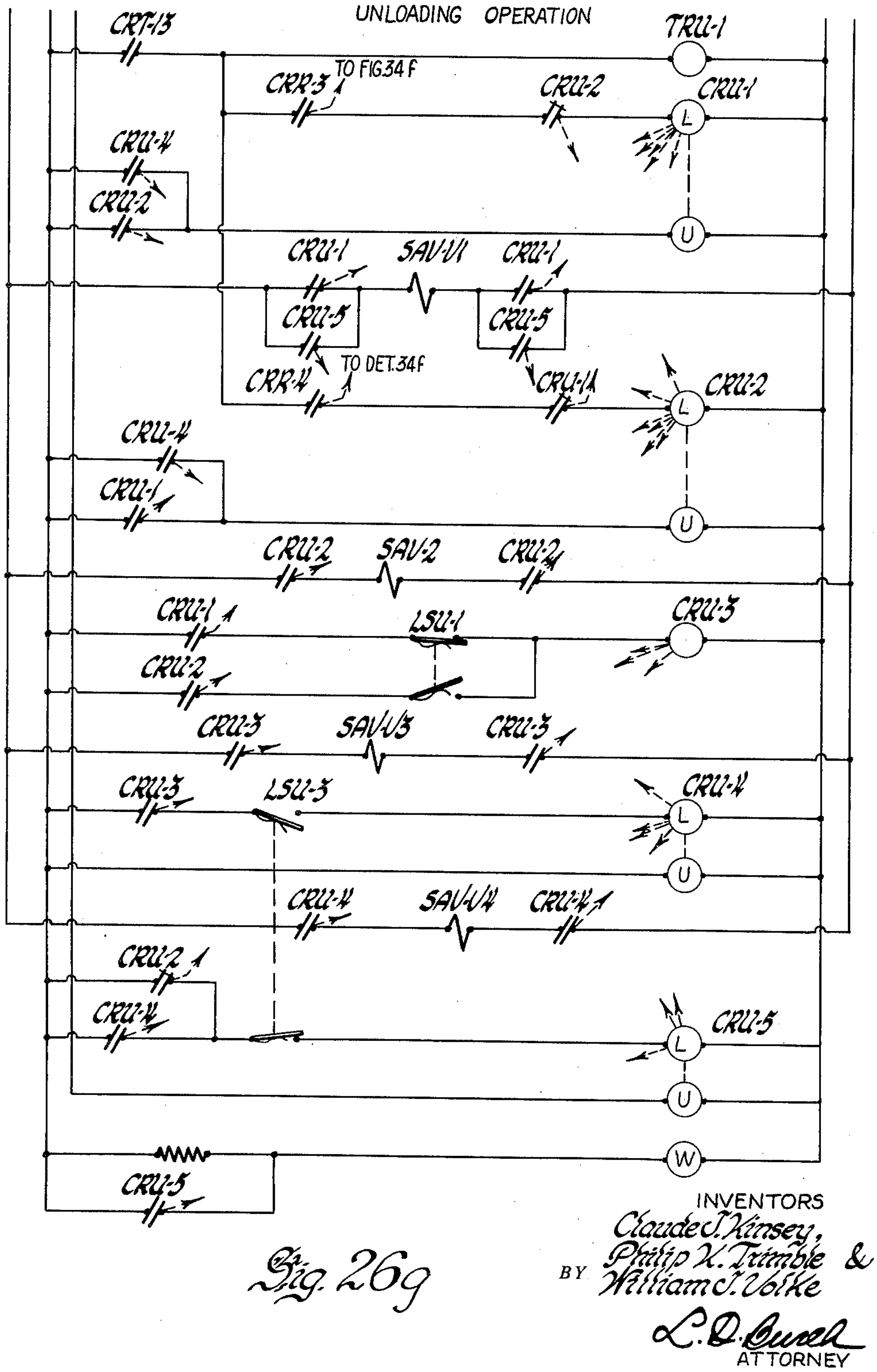

Upon receipt of a work member at the unloading station 20, solenoid valves SAV–U1 or SAV–U2, controlling piston cylinder means 492, reference FIGURE 26*g*, cause the ejector table 490 to be raised or lowered as the situation calls for. The ejector means including the finger 520 are actuated by solenoid valve SAV–U3 controlling piston cylinder 502, reference FIGURE 26*g*, to move the work member to the accept or reject conveyor 498 or 500 at the end thereof. Solenoid valve SAV–U4, reference FIGURE 34*g*, controls the return of the ejector finger by retraction of rack bar 504 through piston cylinder means 502.

A depending member 524 secured to the table 490 is adapted to actuate switch means LSU–1 to signal the raised or lowered position of the ejected table. Switch means LSU–2 are disposed for actuation by the finger 520 to signal the completion of the part ejection.

The balance detection and determination means employed within the proposed balancing machine are preferably those disclosed in United States Patent No. 2,947,-175 to King et al.

The pickup means 260 is a conventionally known linear variable displacement pickup having a movable coil in a strong magnetic field. The coil is actuated by the probe 264, engaging the spindle support collar 222, and provides an alternating current output having a frequency equal to the rotational speed of the work member and an amplitude directly proportional to the unbalance motion of the spindle 176 which is a measure of the amount of unbalance.

The mechanical vibration of the spindle 176 is converted by the pickup 260 to a sinusoidal electrical signal which, with a signal from the unbalance compensator means 270, is fed through amplifier means to a chopper relay actuated by the contact points 348 of the variable phase contactor 285. The variable phase contactor or "angle" breaker means thereof is opened for 180°, or one-half a revolution, and closed the remainder of the cycle by a single lobe cam 360 on the shaft 284 turning at the speed of the work receiving spindle 176 through gear means 278, 280 and 283. Since the contactor housing 342 can be rotated by motor 338 through gear means 334, 328, and 326, the phase angle between the closing of the "angle" breaker means 348 (which operates the chopper relay) and the point of zero voltage of the unbalance signal may be made 90°. When this is done, a zero D.C. output is obtained from the chopper relay, and for any angular separation between the close (or opening) of the angle breaker and the unbalance signal point of zero voltage, a D.C. output will be obtained from the chopper relay. The D.C. output or error voltage from the chopper relay is amplified and fed to the angle servo motor 338 which, through the gear train 334, 328 and 326, will turn the variable phase contactor housing 342 until the D.C. output or error voltage becomes zero, whereupon the variable phase contactor housing is positioned relative to the angle of unbalance.

The amount of work member unbalance is detected by the pickup means 260 and the cumulative signal from the pickup and the unbalance compensator means 266, which signal, following amplification, passes through a chopper relay operated by a second set of contact points 346 in the variable phase contactor 285.

The second set of contact points, or "amount" breaker 346, is operated by the same single lobe cam 360 which operates the "angle" breaker 348 but is situated in the contactor housing 342 such that it "makes" for 90° before the "angle" breaker. Since the contactor housing 342 has been positioned by the angle servo motor 338, as previously explained in the determination of the angle of work member unbalance, the closing and opening of the "amount" breaker coincides with the point of zero voltage of the unbalance sinusoidal wave and the output of the chopper relays is thus a full wave rectification of the input sine wave having a D.C. voltage level proportional to the amplitude of unbalance in the work member.

The difference between the average D.C. output of the chopped unbalance sine wave and a D.C. reference voltage level determined by the position of the movable arm 364 on the amplitude potentiometer 366 is the error voltage which, when amplified, is applied to the amplitude servo motor 362. The amplitude servo motor 362 through a gear train 368, 370 and 378 rotates the arm 364 of the amplitude potentiometer 366 until the error voltage becomes zero and cam 376 on the feed roller shaft 394 is thus positioned, as through gear means 379 and 378, to control the amount of strip material 404 to be measured off and welded to the work member.

The static balancing machine here disclosed is designed to automatically load work members 36 from a conveyor 32 onto the machine; automatically determine the amount and angle of unbalance and index the work member to the proper position with respect to such angle; automatically measure, cut off and position a piece 440 of strip material to correct for the amount of unbalance found; automatically weld the piece 440 of strip stock to the work member; automatically check the work member to determine that correction is sufficient and properly positioned; automatically dispose the work member onto either a conveyor means 498 to accept the work member or a conveyor means 500 for rejecting the work member; and automatically transfer work members from each work station to the next succeeding work station.

The disclosed electrical connections of FIGURES 26 are for automatic operation. However, manual control means may be provided for by selective manual-automatic switch means located at the individual work stations in a manner similar to that provided for in United States Patent No. 2,898,764 to Kinsey et al. This same Patent No. 2,898,764 also discloses interlocking cabinet door switch means adaptable for use with the machine disclosed herein to provide added safety.

Referring now to the electrical controls shown by FIGURES 26, a 3 phase 60 cycle 440 volt power supply source is applied to the balance station drive motor 174 and the recheck station drive motor 175 through contacts MRB and MFB in the circuit of motor 174 and contacts MRR and MFR in the circuit of motor 175. The power source is reduced to 115 volts through a step-down transformer 526 for the other electrical controls.

The transfer operation is controlled by transfer limit switches LST–1 through 5 which, upon closing, energize respective transfer control relays CRT–1 through 6, closing in turn their respective contacts (designated similar to the actuator relays), to energize transfer control relays CRT–8 through 13, which close their contacts to activate solenoid air valves SAV–T1 through T6 controlling piston cylinder means 72, 112 and 120. The transfer limit switch LST–3 will be noted to alternately energize relays CRT–3 and CRT–4 to initiate the movement of the transfer means 34 to either down or up position, respectively. The relay CRT–14 closes its contact to signal the completion of the transfer operation.

The feed line of transfer control relay CRT–7 includes load control relay CRL–7, balance control relay CRB–5, weld control relay CRW–15, recheck control relay CRR–6, unload control relay CRU–5, recheck limit switch LSR–1 which signals the completion of operation at their respective balance machine stations and are required to be closed before transfer control relay CRT–7 is energized to start the work transfer operation. Each work station will be noted to include contacts energized by relays of the transfer controls so that their operation is dependent upon the positioning of the transfer means. Each work station will also be noted to include contacts closed by relays of other stations; making each station dependent upon the operation of other of the work stations.

The unloading operation is controlled by loading limit switches LSL–1 through 4 which, upon being closed, permit loading control relays CRL–1 through 6 to be energized to close certain contacts and energize in proper sequence the solenoid air valves SAV–L1 through L6 to perform the necessary work operations of the loading station.

Loading limit switch LSL–4 acts to alternately energize and deenergize load control relays CRL–5 and CRL–8; relay CRL–8 thereby being energized only when the work jaw means or turnover member 42 is in a return position for receiving a work member. Load control relay CRL–7 closes its contact to signal the completion of the loading operation.

The balance station operation includes balance timer relays TRB–1 through 4 for respectively timing the determination of whether excessive unbalance is present, the setting of the angle servo mechanism 322 and the delay of the start of the amplitude servo mechanism 362, the delay of the zero speed or spindle stopping motor 390, and the delay of the start of the spindle repositioning servo motor 324. The start of operation of respective components of the balance station is controlled by balance control relays CRB–1 through 6 and their respective contacts for starting the amplitude servo 362, signaling the location of unbalance, starting the spindle repositioning servo 324 and engaging the magnetic clutch 316, disengaging the clutch and servo and signaling the completion of balance determination, and for unclamping the collet and by-passing the excessive unbalance signaling means, respectively.

The balance motor 174 is controlled by relays MFB and MRB for forward rotation and reverse rotation of the motor shaft, respectively.

The correction station operation for feeding, measuring, cutting, forming, and positioning the slug of material 440 relative to the work member 36 is accomplished by control relays CRW–1 through 9 energized by the closing of certain relays and of limit switch means LSW–1 through 10 which respectively indicate the return of the strip feed cylinder 388 or the forward position thereof, that the unbalance is over the minimum amount, that there is strip material available, that the slug 440 will not be beyond the maximum length, that the horizontal slug transfer means 444 is returned, that the strip cutoff and form cylinder means 432 are returned, or that such cylinder means are in the forward position, that the vertical slug transferring means 454 are returned, that the travel of the vertical slug transfer means necessary to center the slug 440 relative to the welding electrodes has been accomplished, and that the vertical slug transfer means is in the advanced position.

The welding of the slug 440 to the work member is controlled by relays CRW–10 through 12 and limit switch LSW–11 which is closed when the weld gun 38 is in the forward position clamping the slug 440 to the work member. The 440 volt supply source is applied to the ignition contactor and through the weld transformer to the electrodes 528 and 530.

Correction station relays CRW–13 through 15 are energized by the closing of designated contacts for returning the corrective slug transfer means to their original positions, for starting the amplitude servo 362 for the next corrective slug settings and for signaling the completion of the correction operation. Limit switch LSW–12 signals the return of the welding gun 38 to its return position.

The operation of the recheck station includes timer relays TRR–1 and TRR–3, delaying the stopping of the recheck station balance motor 175 and the actuation of the work marker means 476, respectively. Recheck station control relay CRR–1 initiates the acceptance or rejection signal and through relay CRR–3 and its contact will energize relay TRR–4 to close its contacts and actuate solenoid air valve SAV–R1 of the piston cylinder means to move the marker carriage 482 towards the workpiece for marking the acceptance thereon. Control relay CRR–4 is energized when the work member is not within acceptable balance limitations, relay CRR–5 signals the completion of the recheck operation and relay CRR–6 unclamps the recheck station collet.

The work unloading station operations are controlled by relays CRU–1 through 4 which are respectively energized to raise the ejector platform 490 to the acceptance position, lower the platform to the rejection position, advance the ejector means 520 and return the ejector. Limit switch LSU–1 indicates the position of the ejector platform and limit switch LSU–2 the forward or return position of the ejector means. Relay CRU–5 signals the completion of the unloading operation.

We claim:

1. Work transfer means including parallel spaced work transfer bars having spaced pairs of work receiving fingers secured thereto, means synchronously rotating said transfer bars for raising and lowering said fingers, means synchronously raising and lowering said transfer bars, and means synchronously reciprocating said transfer bars, said fingers being rotated to a raised position to receive work members, raised, moved forward, lowered and rotated to a lowered position to release work members following a return stroke of said transfer bars with said fingers lowered.

2. Shuttle bar work transfer means including parallel spaced transfer bars extending over spaced work stations and having pairs of work receiving fingers secured to said bars adjacent each of said work stations, means synchronously rotating said transfer bars to position said fingers horizontally, means synchronously raising said transfer bars, said fingers engaging and receiving work members from each of said work stations, means synchronously translating said transfer bars and disposing said pairs of fingers and the work members thereon adjacent the next succeeding work stations, means synchronously lowering said transfer bars and disposing said work members at said succeeding work stations, means rotating said bars for lowering said fingers, and means returning said transfer bars for subsequent work shuttle operation.

3. Work transfer means for receiving and conveying work members in spaced steps through a plurality of work stations and which includes, pivotally mounted means receiving and turning work members over for inspection, parallel spaced transfer bars having spaced pairs of work receiving fingers for receiving work members from said pivotally mounted work receiving and turnover means, means rotating, raising, translating and lowering said bars between spaced work stations, and vertically adjustable means following the last of said work stations for receiving work members from said transfer bars and ejecting said work members onto vertically spaced work accepting and rejecting means in automatic accordance with the character of said work members.

References Cited by the Examiner

UNITED STATES PATENTS

| | | | |
|---|---|---|---|
| 408,152 | 7/1889 | Wellman | 214—27 |
| 1,249,130 | 12/1917 | Lathrop et al. | 198—221 |
| 1,368,780 | 2/1921 | Anderson. | |
| 1,839,438 | 1/1932 | Prussing. | |
| 1,878,156 | 9/1932 | Lorenz. | |
| 2,667,062 | 1/1954 | Johns | 198—221 X |
| 2,681,136 | 6/1954 | Ipsen | 198—221 |
| 2,718,314 | 9/1955 | Nelson | 198—221 X |
| 2,745,167 | 5/1956 | Cross | 198—19 X |
| 2,804,962 | 9/1957 | Sherman | 198—19 |
| 2,808,746 | 10/1957 | Blomquist | 198—221 X |

SAMUEL F. COLEMAN, *Primary Examiner.*

ERNEST A. FALLER, *Examiner.*

UNITED STATES PATENT OFFICE
CERTIFICATE OF CORRECTION

Patent No. 3,235,073 February 15, 1966

Claude J. Kinsey et al.

It is hereby certified that error appears in the above numbered patent requiring correction and that the said Letters Patent should read as corrected below.

Column 3, line 29, after "cylinder" insert -- means --; line 62, for "eoch" read -- each --; column 8, line 71, for "ejected" read -- ejector --; column 10, line 4, after "that" insert -- the --.

Signed and sealed this 31st day of January 1967.

(SEAL)
Attest:

ERNEST W. SWIDER
Attesting Officer

EDWARD J. BRENNER
Commissioner of Patents